US006817716B1

(12) United States Patent
Hines

(10) Patent No.: US 6,817,716 B1
(45) Date of Patent: Nov. 16, 2004

(54) AERIAL-IMAGE DISPLAY SYSTEMS

(76) Inventor: Stephen P. Hines, 4525-B San Fernando Rd., Glendale, CA (US) 91204

( * ) Notice: Subject to any disclaimer, the term of this patent is extended or adjusted under 35 U.S.C. 154(b) by 0 days.

(21) Appl. No.: 10/655,974

(22) Filed: Sep. 5, 2003

Related U.S. Application Data

(63) Continuation of application No. 09/687,618, filed on Oct. 13, 2000, now abandoned.
(60) Provisional application No. 60/159,223, filed on Oct. 13, 1999.

(51) Int. Cl.[7] .................. G03B 21/00; G03B 21/26; G02B 27/14
(52) U.S. Cl. .................. 353/10; 353/7; 353/28; 359/631
(58) Field of Search .................. 353/10, 7, 28; 359/629–631

(56) References Cited

U.S. PATENT DOCUMENTS

| | | | |
|---|---|---|---|
| 243,813 A | 7/1881 | Taylor | 359/448 |
| 1,699,689 A | 1/1929 | Curry | 40/538 |
| 2,490,747 A | 12/1949 | Creighton | 356/251 |
| 2,576,147 A | 11/1951 | Sauvage | 40/427 |
| 3,096,389 A | 7/1963 | Dudley | 359/871 |
| 3,443,858 A | 5/1969 | La Russa | 359/494 |
| 3,493,290 A | 2/1970 | Traub | 359/479 |
| 4,093,347 A | 6/1978 | La Russa | 359/630 |
| 4,200,366 A | 4/1980 | Freeman | 353/78 |
| 4,348,187 A | 9/1982 | Dotsko | 434/44 |
| 4,671,625 A | 6/1987 | Noble | 359/726 |
| 4,859,031 A | 8/1989 | Berman et al. | 349/11 |
| 5,214,458 A | 5/1993 | Kanai | 353/63 |
| 5,311,357 A | 5/1994 | Summer et al. | 359/479 |
| 5,430,474 A | 7/1995 | Hines | 348/42 |
| 5,457,508 A | 10/1995 | Ichihara et al. | 353/10 |
| 5,477,394 A | 12/1995 | Shibazaki | 359/858 |
| 5,483,307 A | 1/1996 | Anderson | 353/98 |
| 5,552,934 A | 9/1996 | Prince | 359/629 |
| 5,671,992 A | 9/1997 | Richards | 353/7 |
| 5,782,547 A | 7/1998 | Machtig et al. | 353/28 |
| 5,886,818 A | 3/1999 | Summer et al. | 359/478 |
| 5,940,167 A | 8/1999 | Gans | 352/43 |
| 5,944,403 A | 8/1999 | Krause | 353/74 |
| 6,042,235 A * | 3/2000 | Machtig et al. | 353/28 |
| 6,147,805 A | 11/2000 | Fergason | 359/630 |
| D435,043 S * | 12/2000 | Hines | D14/304 |
| 6,211,613 B1 | 4/2001 | May | 313/504 |
| 6,292,305 B1 | 9/2001 | Sakuma et al. | 359/649 |
| 6,318,868 B1 * | 11/2001 | Larussa | 359/857 |

FOREIGN PATENT DOCUMENTS

| | | |
|---|---|---|
| CH | 67934 | 1/1992 |
| WO | WO 89/09423 | 10/1989 |

* cited by examiner

Primary Examiner—David Gray
Assistant Examiner—Magda Cruz
(74) Attorney, Agent, or Firm—John E. Wagner

(57) ABSTRACT

Apparatus for producing aerial-images is disclosed employing a combination of focusing reflectors, beamsplitter polarizing filters, and light sources. An object to be displayed is illuminated, and its image partially reflected by the beamsplitter to a focusing mirror and reflected to an aerial position. A polarizer prevents ambient light or images from degrading or interfering with the aerial-image. A clock radio, personal television display counter, as well as animated mannequin versions are disclosed.

14 Claims, 21 Drawing Sheets

AERIAL-IMAGE DISPLAY SYSTEMS

This application is a continuation of Ser. No. 09/687,618 filed Oct. 13, 2000 now abandoned, which claims the benefit of the U.S. Provisional Patent Application Ser. No. 60/159,223 filed Oct. 13, 1999, and hereby claims the benefit of the embodiments therein and of the filing date thereof and is incorporated herein by reference.

BACKGROUND OF THE INVENTION

Aerial-image displays in which an image of an object appears in space are intriguing whenever seen. Examples of aerial-images may be found in the following environments:

Example 1: theme parks having a haunted mansion with dancing skeletons;

Example 2: magical stage acts with apparent floating heads;

Example 3: motion picture illusions depicting ghostly figures.

Typically, these images are beyond reach of the observer and recognized to be an illusion and transitory so as not to be carefully examined by the observer. Seldom have such images been produced with such precision and detail that they convince the observer that they are the actual objects displayed. Likewise, seldom, if ever, are they displayed within reach of the observer who can try to touch them only to be surprised upon realizing that the three-dimensional image hangs in mid air. Hence, the term "aerial image". Likewise, it is not possible to my knowledge to produce an aerial-image of an object in which the observer, standing in one position, can see the object rotate before his eyes and examine it in detail without having the actual object in reach.

Examples of aerial systems are disclosed in the following patents:

U.S. Pat. No. 5,944,403 D. Krause Aug. 31, 1999

U.S. Pat. No. 4,348,187 M. Dotsko Sep. 7, 1982

In the case of displaying retail merchandise, a perennial problem typically in the jewelry trade is to allow a prospective customer to visually examine the merchandise, such as jewelry, from all sides without touching the jewelry. Keep mind that in the sales effort, touching the jewelry has heretofore been necessary in most cases.

Employing an aerial-image of fine jewelry can eliminate the need to touch the jewelry by casual shoppers and also provides for security of the actual jewelry, while allowing the casual observer and potential customer to view it as completely as if they had the jewelry in their hands.

Likewise in the jewelry field, most retailers must remove fine jewelry from their display cases or windows at night and thereby forego the opportunity to display the fine jewelry through a show window or showcase while the jewelry is in a secure or remote location.

In the entertainment field, the aerial-image display can be used to provide a totally realistic image of a natural object in space, within reach of an observer, again without contact by the observer. The effect of the image appearing to be the actual object, but without the tactile feel when attempted to be touched, is a marvelous attention getter.

At trade shows, objects can be displayed and rapidly changed at the same location and the viewer sees the aerial-image and not the actual object in close proximity as would be the case if the actual object were on display.

In the field of video games, a reasonably high degree of reality can be portrayed on a video screen, but by the very nature of the screen's presence, the player is intensely aware that the entire scene is on a video screen. Attempts have been made to enhance or disguise directly viewed video displays (usually CRTs) with unexciting results.

In the field of transportation, particularly aircraft and automobiles, the use of "heads up" displays are becoming popular. They involve complex optics, which display the instruments on the canopy of aircraft or windshields of automobiles. In accordance with this invention, such aerial-images may be displayed between the eyes of the pilot or driver and the canopy or windshield.

These are just a few examples of the application of this invention and are by no means all of the applications to which this invention may be applied.

In any situation where an accurate display of an object for a number of observers is needed, the aerial-image display of this invention is applicable. Other examples include various levels of education from elementary through graduate schools. In scientific and medical institutions, aerial-image displays, in accordance with this invention, may be an ideal teaching tool to present details to a number of students simultaneously with any of them being able to point to an area of the aerial-image corresponding to the area of the object displayed in full view of the other observers.

In accordance with this invention, the optics are extremely precise producing realistic images but not so complex that the aerial-image display of this invention may not be incorporated in day-to-day objects around the home, primarily for personal use. An example is a bedroom clock, which displays the clock face in nearby space but without any interference with the observer should he enter the image space.

BRIEF DESCRIPTION OF THE DRAWING

This invention may be more clearly understood from the following detailed description and by reference to the drawing in which.

DETAILED DESCRIPTION OF THE INVENTION

Figure 1:
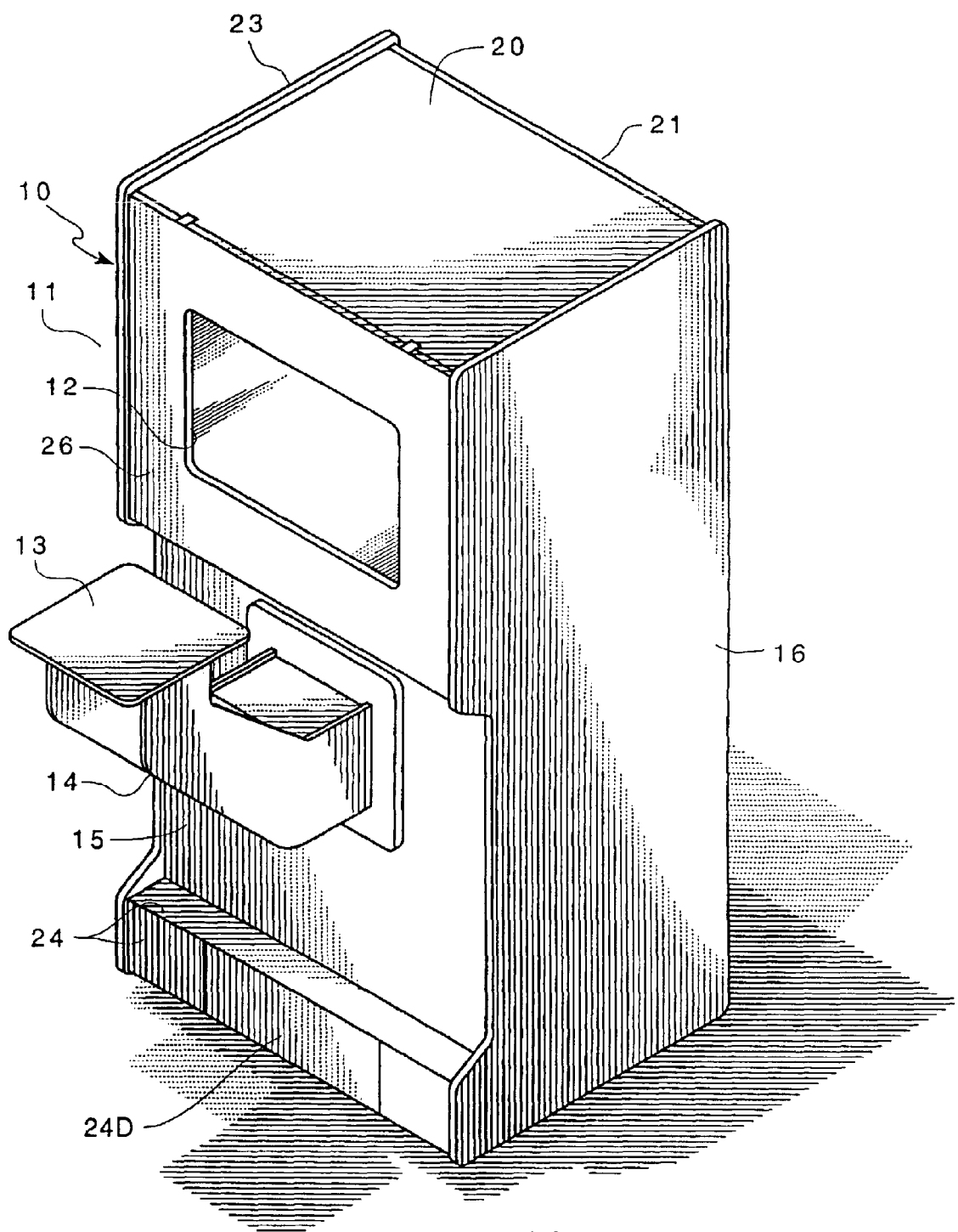
FIG. 1 is an isometric view of an aerial-display device in accordance with this invention in the form similar to the popular video game housings.
Figure 2:
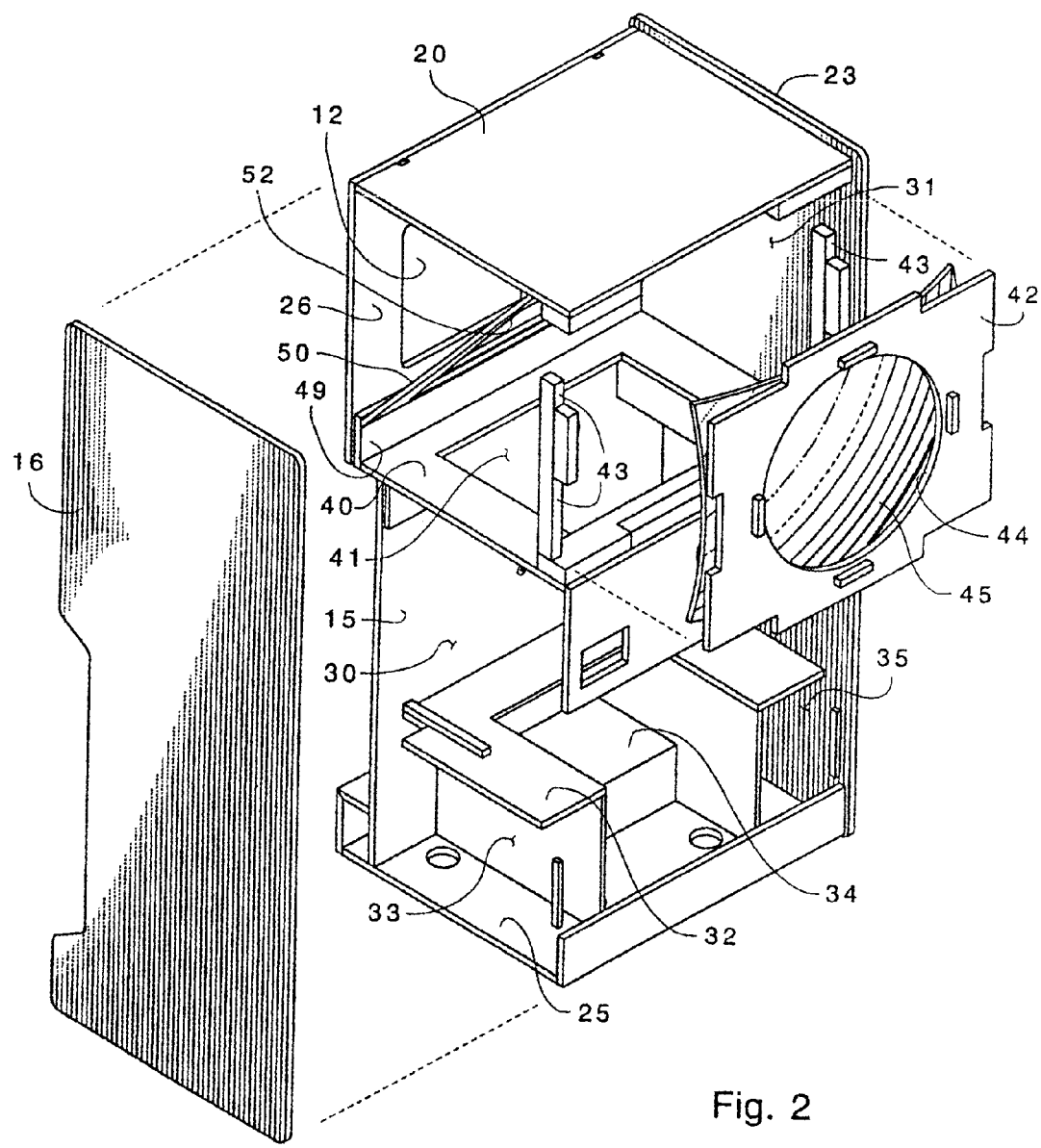
FIG. 2 is a rear three-quarter partly exploded isometric view of the housing of FIG. 1.
Figure 3:
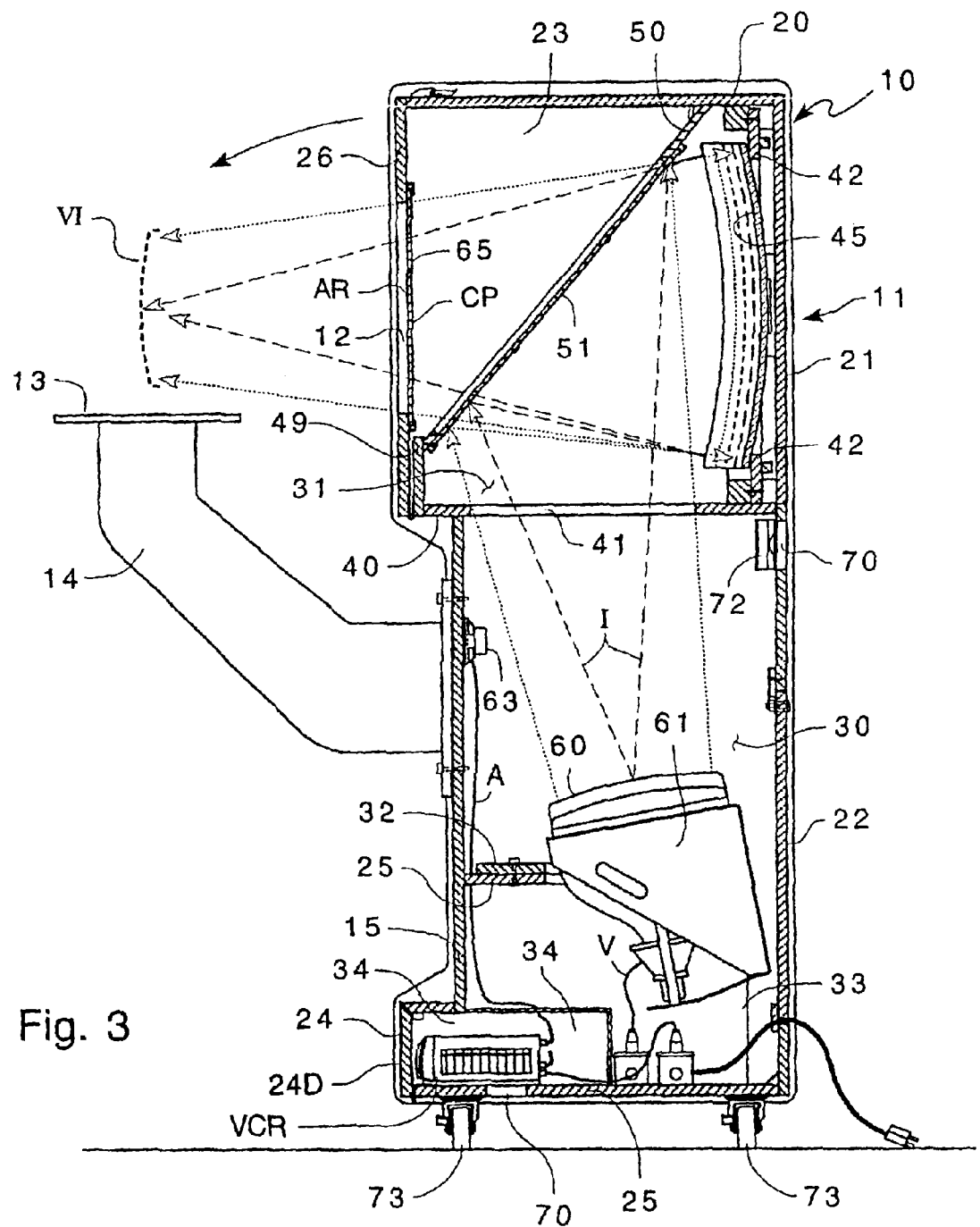
FIG. 3 is a vertical sectional view through the housing of FIG. 1 showing the relative positions of the optical elements of the invention when the source of the image to be displayed is a video screen showing the field rays defining the full field in dotted lines and the image rays in dashed lines.

In order to understand this invention, reference is now made to FIGS. 1 through 3, which demonstrate its basic concept. FIG. 1 shows this invention as applied to an aerial-image display system, generally designated 10, in the form which may be used for displaying objects, in the order of 12 inches in diameter as a practical maximum for this type of use.

The embodiment is contained within a housing, generally designated 11, having a window opening 12 in the front face and an image shelf 13 on a support arm 14 secured to the front lower panel 15. The housing 11 is enclosed by a left panel 16, a top panel 20, two front panels 26 at the top, and lower panel 15, two rear panels 21 and 22, of which only 21 appears in FIG. 1, a right panel 23, and a lower step panel 24. The housing 11 is closed at the bottom by a bottom panel 25 appearing in FIG. 2. The window opening 12 is located in upper front panel 26. The panels mentioned so far, with the exception of panel 26, are normally secured and not open during normal use or maintenance. The panel 26 is hinged at its lower edge to allow it to be opened for possible cleaning of certain of the optics, if required.

The image shelf 13 is used as a visual reference and as a support for props to enhance the illusion, such as a vase for flowers, which is normally expected to rest upon a support. The image shelf 13 and its support arm 14 are optional, and for many applications their presence is undesired and may be removed. Such an embodiment appears in FIG. 11.

In the embodiment shown in FIGS. 1–3, each of the panels may be of plywood or particleboard, typically covered with plastic lamination having suitable finish on the exterior as dictated by the environment. Most of the interior surfaces are finished in dull black to prevent unwanted reflections.

Referring again to FIG. 1, the stepped panel 24 includes a door 24D, which provides access to an interior chamber designed to hold a VCR tape player providing the scene to be displayed on the video monitor of FIG. 3 described below.

Referring now specifically to FIG. 2, it may be seen that the interior of housing 11 includes basically a lower chamber or first region 30 in which the object to be displayed or the source of the image is located, and an upper chamber or second region 31, in which the image from the source is transformed into the aerial-image, which appears outside of the window opening 12. Within the lower chamber 30 is the support structure 32 resting on the base 25 and defining an electrical outlet chamber 33, the VCR enclosure 34, providing additional storage space 35.

The lower chamber 30 and the upper chamber 31 are separated by platform 40, including an image transfer opening 41. The platform 40 provides physical support for an apertured mirror support board 42, which is shown exploded to the rear but is normally located at the rear of the upper chamber 31 and is supported by brackets 43, which are secured to the side walls 16 and 23, respectively. The mirror mounting board 42 has a large central, circular opening 44 dimensioned to receive a concave mirror 45.

The upper chamber 31 also encloses a frame 50 that is used to support a partially reflective-transmissive beamsplitter mirror 51 of FIG. 3. The frame 50 is secured at a lower edge to a bracket 49, which is attached to platform 40 and top panel 20. The positioning of this frame 50 is better seen in FIG. 3 and in detail in FIG. 5.

For an understanding of the optics of this invention, which makes possible the aerial-image outside of the housing 11, reference is now made to FIG. 3. In this embodiment of FIG. 3, the source of the image to be displayed is a video monitor 60 that is supported by frame 61. The source of the aerial-image electronic signal is the video tape player shown in enclosure 34. The image from the video monitor 60 is directed upward toward partially silvered mirror 51, i.e., partly reflective means which reflects part of the video monitor image to the concave mirror 45. Mirror 45 reflects the image through the partly silvered mirror 51 and through window opening 12 outward and into focus at position VI above the image shelf 13 and approximately 18 inches in front of window opening 12 in this embodiment. The mirror 45 and partially silvered mirror 51 constitute means for generating and directing the aerial-image out of window 12.

Viewers standing in front of the aerial-image displaying system 10, within a horizontal audience angle of approximately 43 degrees, see an aerial-image appearing to be present above the image shelf. The viewer looks at window opening 12 and sees only a dark window 65, without any view of the mirror 45, of any image within the housing or any reflected image of the observer. These are accomplished by the presence in the window 65 of an anti-reflective coating on a glass laminated optical circular-polarizing window 65. The circular-polarizing layer CP window 65 causes any external light entering the housing 10 to be cancelled after reflection by the mirror 45.

Likewise, the observer sees no image of the mirror 45 or other interfering images, only the floating aerial-image is present in front of the housing 11. It is, therefore, submitted that the combination of the image source, the concave mirror, and the circularly-polarized anti-reflection window cooperate to provide the aerial-image without any disturbing unwanted images. The circular-polarizing layer CP prevents external ambient illumination from being used by the observer from viewing the internal optics, including the directing means mirror 45 and half-silvered mirror 51. Although not mandatory, the anti-reflective coating AR prevents the observer from seeing his image reflected in the window 12.

Because of the confined nature of the housing, cooling air openings 70 in the baseboard 25 are present. An exhaust port 71 and exhaust fan 72 at the top of chamber 30 are used to extract heat from the interior. In FIG. 3, the system 10 is shown with caster wheels 73 for mobility and also to elevate the base 25 above the supporting floor to aid in air movement.

Figure 4:
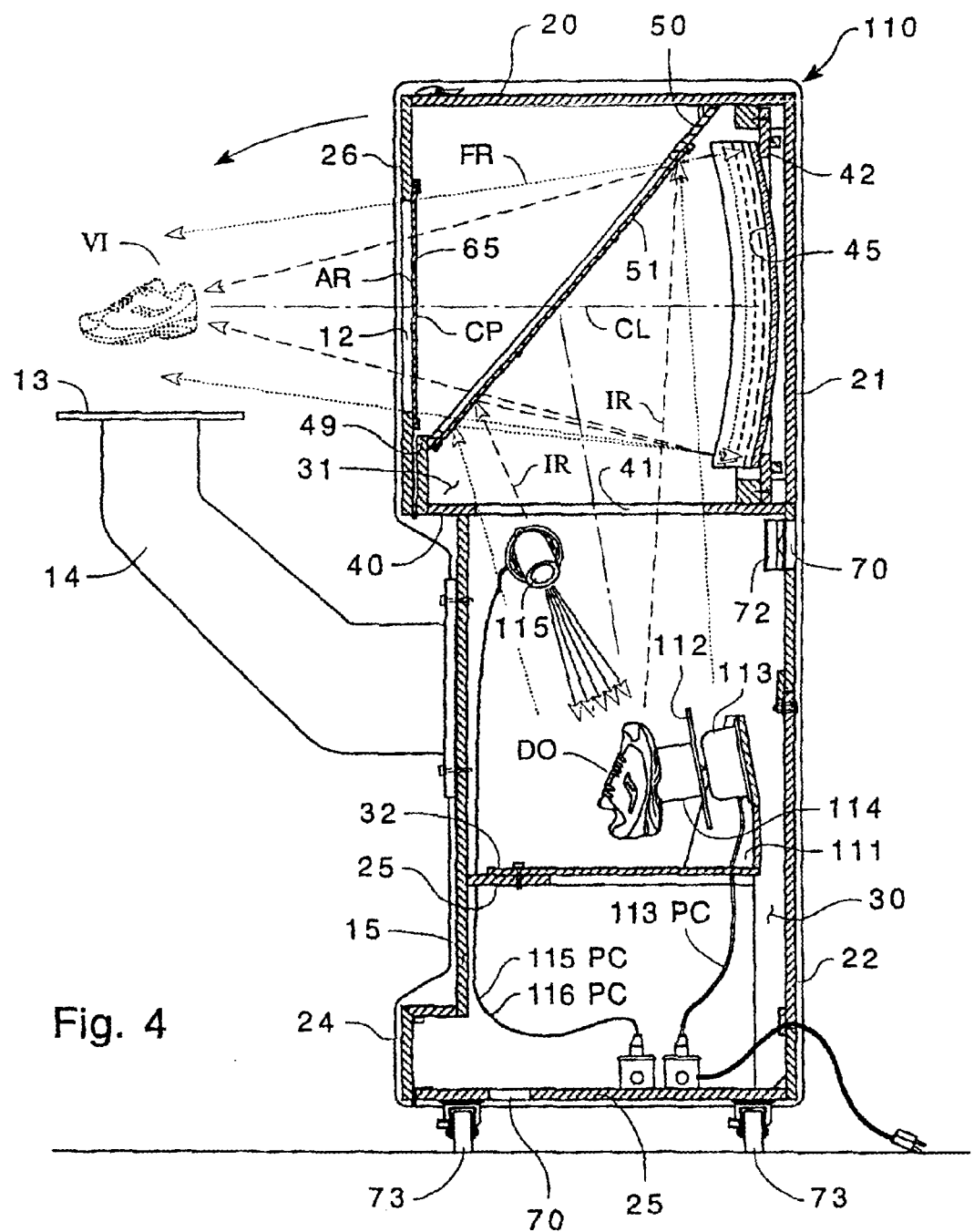
FIG. 4 is a vertical sectional view of the embodiment of FIG. 1 designed to produce aerial-images of a physical object in either a fixed position or rotatable on a turntable.

Referring now to FIG. 4. The same basic system of this invention may be used in displaying actual objects, including the feature of showing them rotating in front of the observer and is accomplished by certain changes in the system. In each case where the identical component is used in FIG. 4 as in FIGS. 1 through 3, the same reference numbers are used.

In this case, no video monitor or any of its components are required. Instead, a bracket 111 and turntable 112 are rotated by a motor 113, which provides rotation at speeds such as 3 rpms. Any object DO located on bracket 114 will form an aerial-image VI as is shown above the image shelf 13 in as clear and complete detail as the object itself presents.

Figure 10:
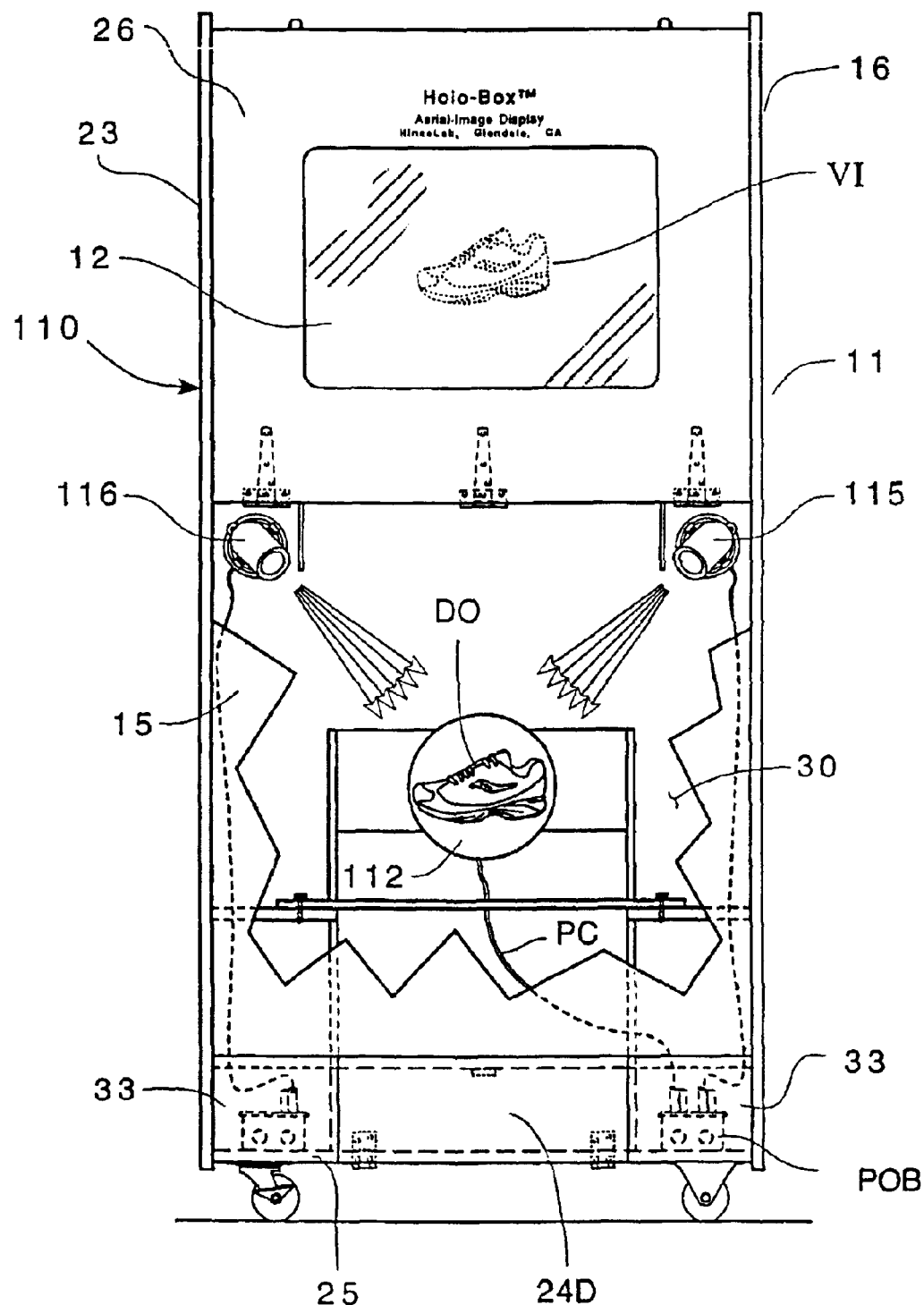
FIG. 10 is a front elevational view of the display device of FIG. 4 with the lower front housing partly broken away to illustrate the position of the internal lamps relative to the turntable and object to be displayed.

In this embodiment, a pair of lamps 115 and 116, both of which appear in FIG. 10, illuminate the display object DO, but only lamp 115 appears in FIG. 4. The lamps 115 and 116 typically are of the internal reflector type, MR16, of lamp of 115V, 35 watt rating to produce a bright view of the object DO with limited beam spreading. Since the display object DO is located on turntable 112, the lamps 115 and 116 are directed at successive sides of the object, the image appears as in ordinary ambient conditions. With proper angular positioning of the two lamps 115 and 116, the entire surface of the object visible to the observer is clearly illuminated. To view the opposite side, the observer need only wait until the object rotates.

In FIG. 4, similar to FIG. 3, the image rays are designated by dashed lines from the object to the concave mirror 45, through the partially reflective mirror 51, through the front window 65 with its circular polarized and anti-reflective coated glass 12.

Objects to be displayed can be placed on the turntable with the turntable motor inoperative to provide the static aerial-image of the display object.

One of the key elements of the optical system of this invention is mirror 45, which is simple and effective. The mirror is made of glass with precision curvature and reflective front surface coating to provide an accurate image. The mirror is concave with the focal point at or near the image location VI. The mirror is of generally rectangular shape when viewed from the front. The rectangular shape is defined by the shape available within a housing 11 to make it as large as possible and to provide a large, high-quality image. A highly reflective coating is used because of the inherent loss of light, due to the inefficiency of the beamsplitter mirror 51. A spherical shape is preferred, although other concave shapes may be used.

Figure 9:
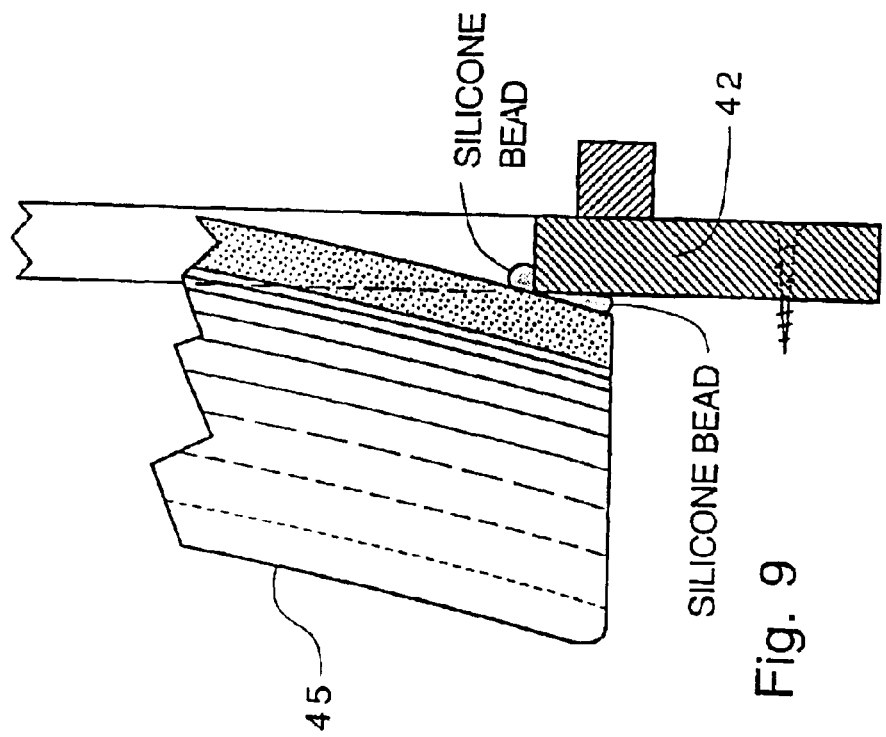
FIG. 9 is a sectional view through a portion of the concave mirror used in this invention.
Figure 7:
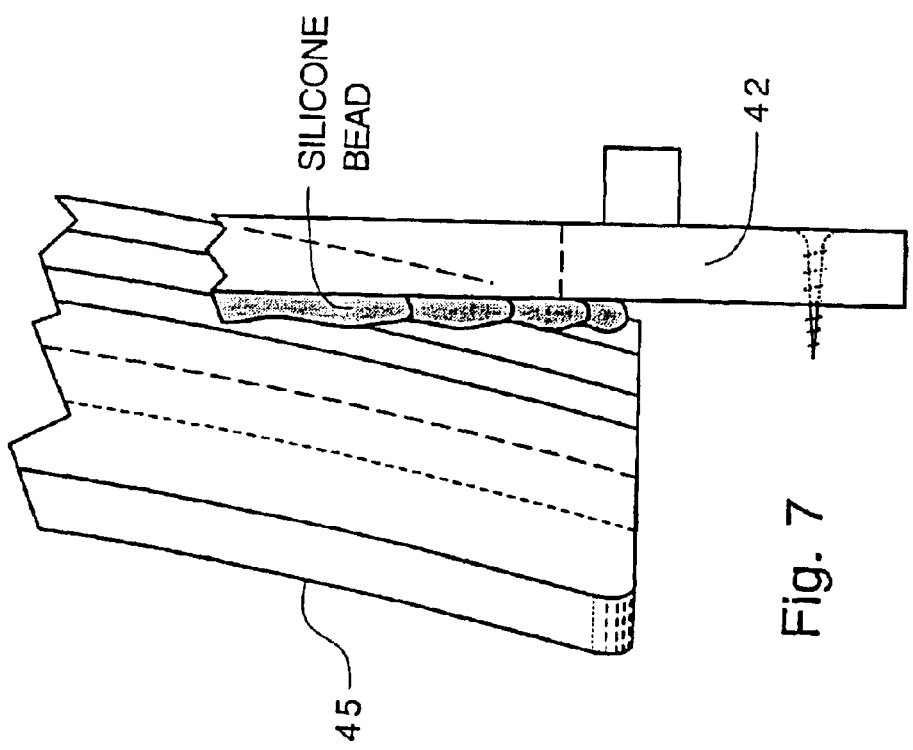
FIG. 7 is a detailed view in section of the mounting arrangement for the concave mirror on its supporting board.

The mounting details of the mirror 45 may be better seen in FIG. 9 where the mounting board 42 includes the circular opening 44 and the mirror 45, being concave and circular, rests in the opening 44 and is secured in place by a bead 80 of flexible adhesive, such as silicone cement, in which the mirror rests. There is substantial surface contact behind the face of the mirror with the silicone adhesive in good contact between the inside surface of the board 42 and at the inside of the opening 44. This also provides a degree of shock mounting of the mirror, while precisely holding the mirror in place.

Figure 8:
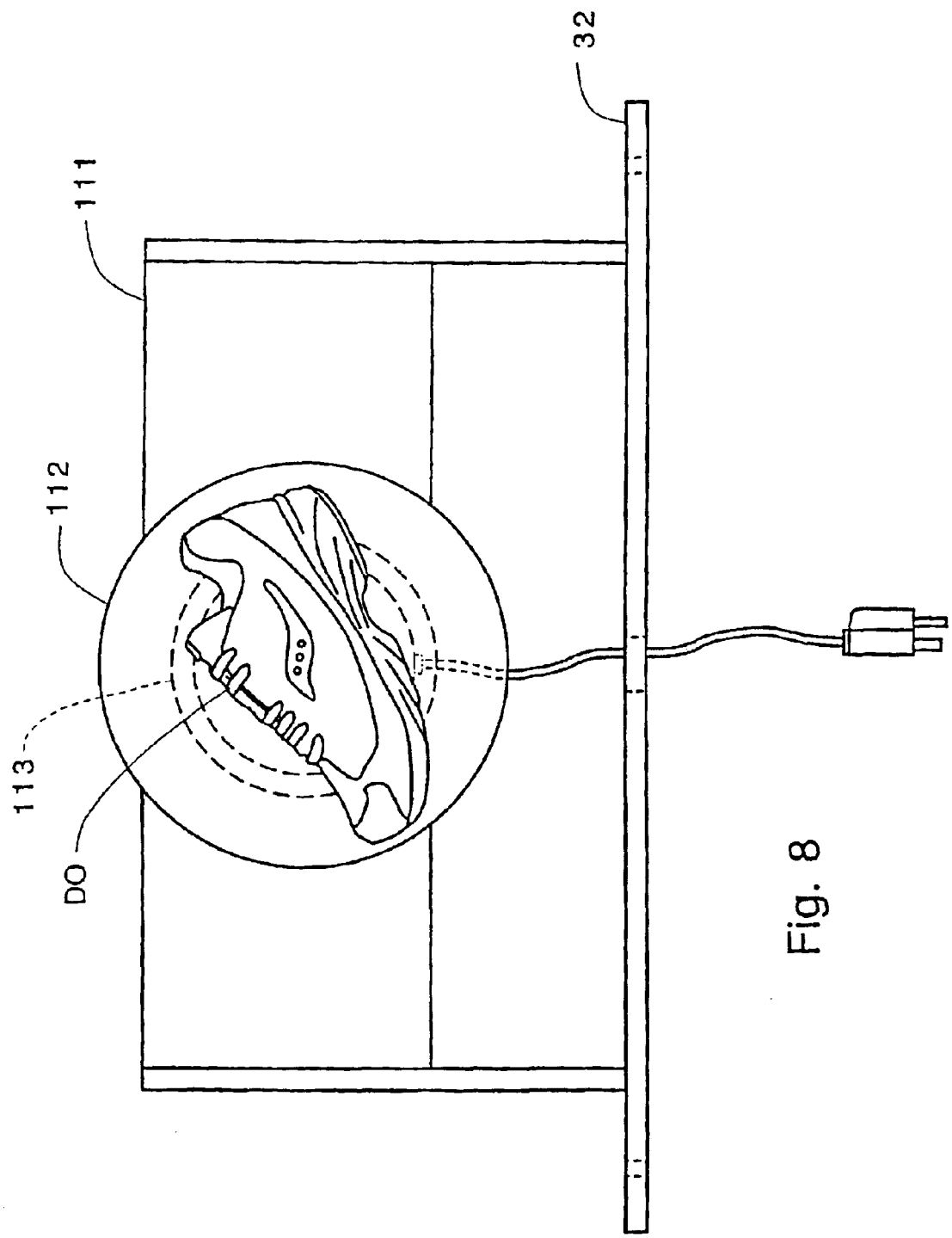
FIG. 8 is a front elevational view of the object turntable of FIG. 4.

The turntable assembly of FIG. 4 may best be seen when viewed from the front side in FIG. 8. It is mounted on bracket 111 with the turntable 112 itself constituting a flat plate of diameter that is determined by the weight of the objects to be carried. Lightweight objects, e.g., 10 lbs. or less, can be supported on a turntable broader than one shown in FIG. 8, which is 11 inches in diameter. The bracket 111 is not to be seen by the observer so it must be totally concealed below the display object DO. Likewise, the turntable 112 is not intended to be seen. Therefore, it is painted a dull black to blend in with the other background surfaces.

Positioned directly below the turntable is a direct drive motor 113. The motor 113 may be of variable speed or single speed. I have found that the single speed of three revolutions per minute is most effective for displaying objects for close examination and for dramatic effect. It is possible for the observer to examine objects with a magnifying glass for remarkable realism.

Reference is again made to FIGS. 4 and 5 showing details of the optical elements of the system 110. Front window 65, with its anti-reflective front layer AR and its circular-polarize CP, is viewed by the observer as dark glass in the front opening 12 of the upper panel 26. Behind that front window 65 is the partially reflective mirror 51 in its frame 50, which is installed at approximately an 50 degree angle with respect to the horizontal axis CL of mirror 45. These angles are determined primarily with respect to the desire to minimize the housing 11 depth, and this does not effect the optical properties of the system when kept within the angular limits of the field rays with respect to the axis CL.

Figure 5:
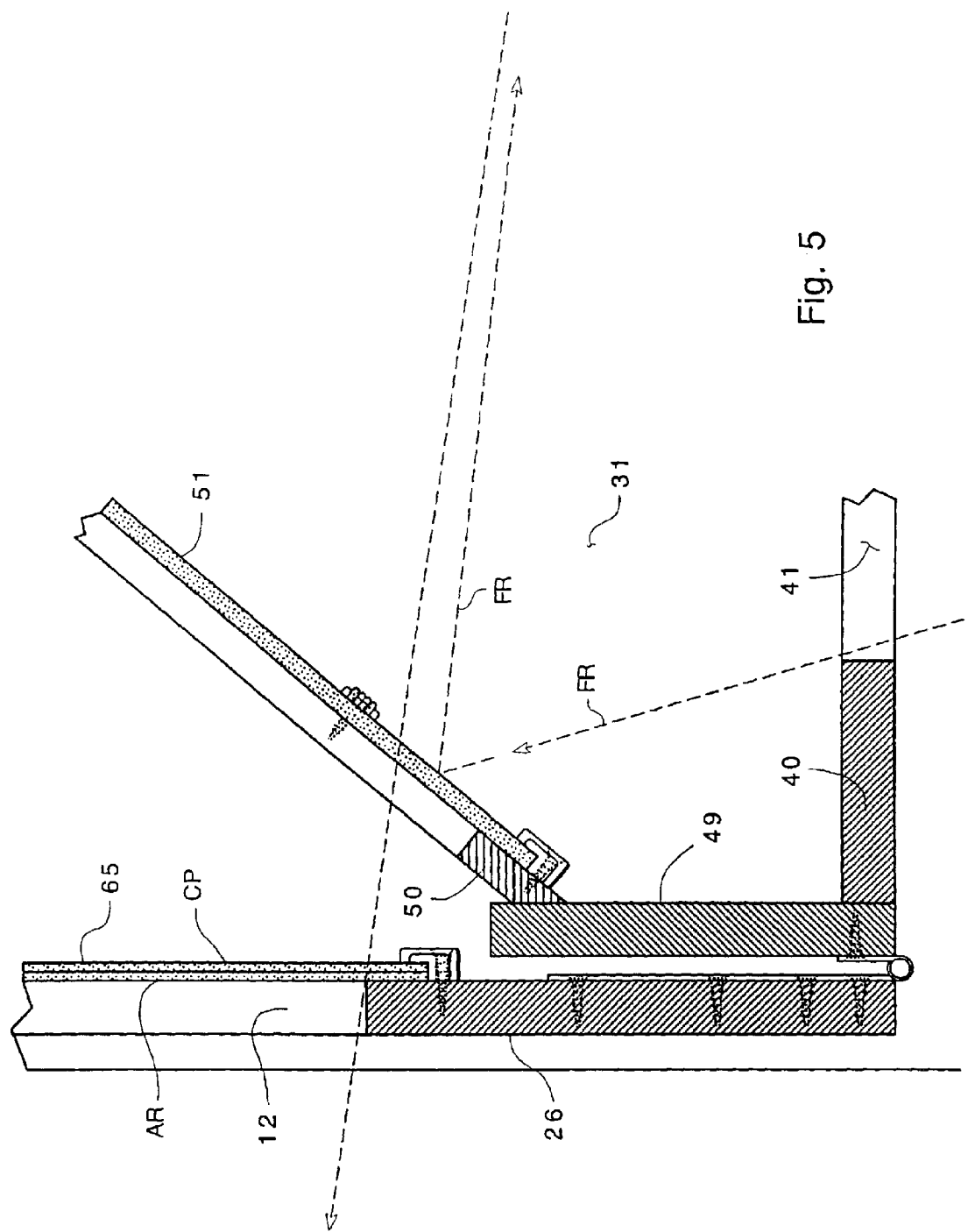
FIG. 5 is a vertical sectional detail of the partially silvered beamsplitter and circular polarizer of this invention shown attached to their respective mounting boards.
Figure 6:
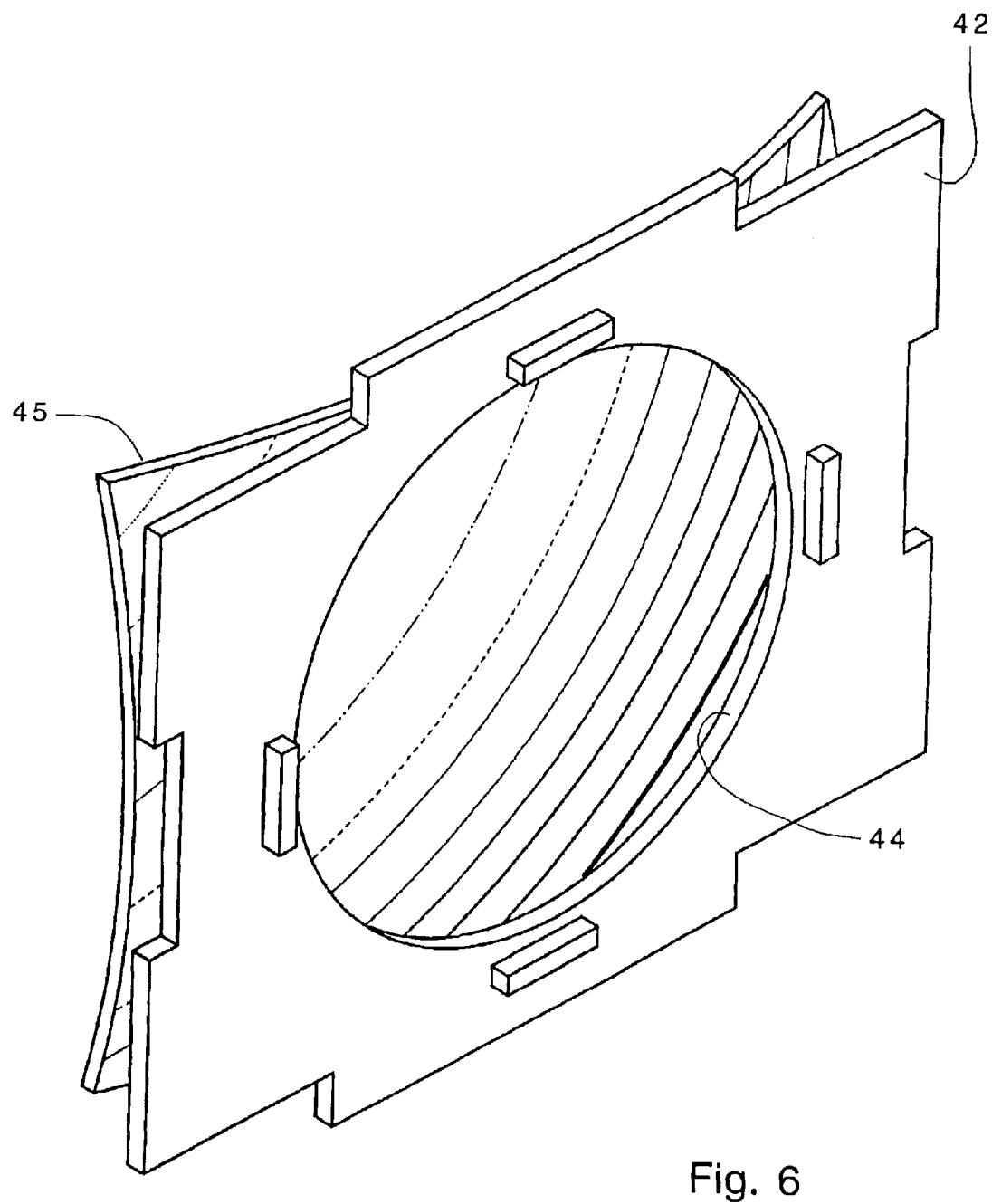
FIG. 6 is an isometric view of the concave mirror mounting board and mirror.

FIG. 4 also shows field rays FR which define the limits of field of the system 110 in which the image rays of the actual object must fall. The window 65 is a high-grade glass with an anti-reflective front surface AR and laminating the circular polarizer CP. The window 65 is secured by brackets 49 to the front top panel 26. Note, as best seen in FIG. 5, that the panel 26 is hinged at its bottom edge to the remainder of the housing 11 at frame member 49. The angled frame 50 is also secured to frame 49 at its lower end, and at its upper edge, which is not shown in FIG. 5, to the underside of the top panel 20 of the housing 11 at the required angle.

FIG. 10 illustrates clearly the lamps 115 and 116 directed at approximately 45 degree angles with their beams directed at the display object DO on turntable 112. When the power cords 115PC and 116PC from the lamps 115 and 116 are connected to outlet boxes, the lamps 115 and 116 may be energized. When the power cord PC from the turntable motor 113, and shown in FIGS. 4 and 10, is connected to one of a number of power outlet boxes contained within the housing 11 and energized, the turntable rotates under the light of lamps 115 and 116. These are all viewable in FIGS. 4 and 10 with lower front panel 15 partly broken away. FIG. 4 also shows hinges shown in dashed lines and the latch is for the top front panel 26.

Figure 11:
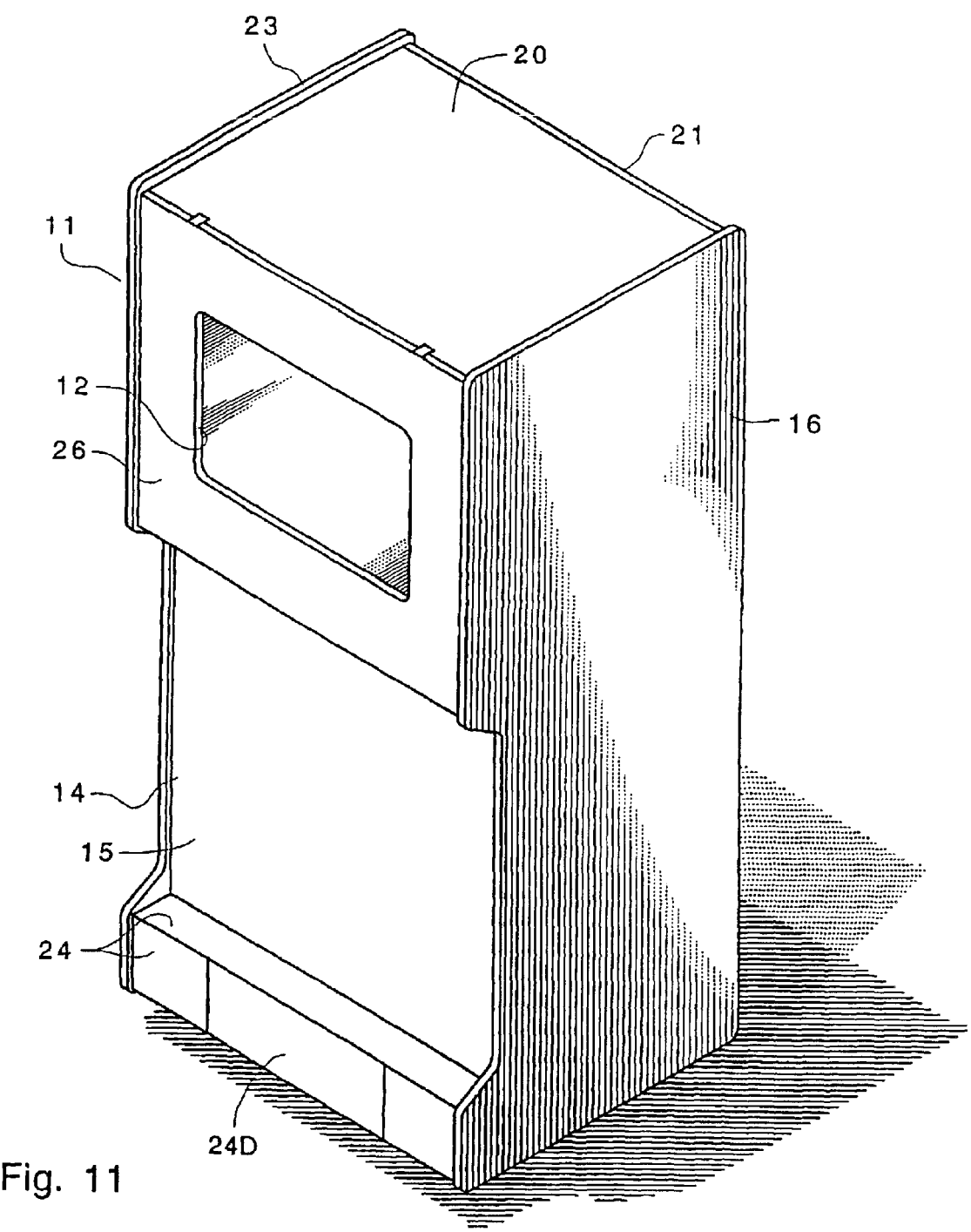
FIG. 11 is an isometric view of an alternative embodiment of this invention designed for aerial display without an image shelf.

FIG. 11 illustrates either of the embodiments of FIG. 3 or 4 without any image shelf 13 or support 14.

Figure 12:
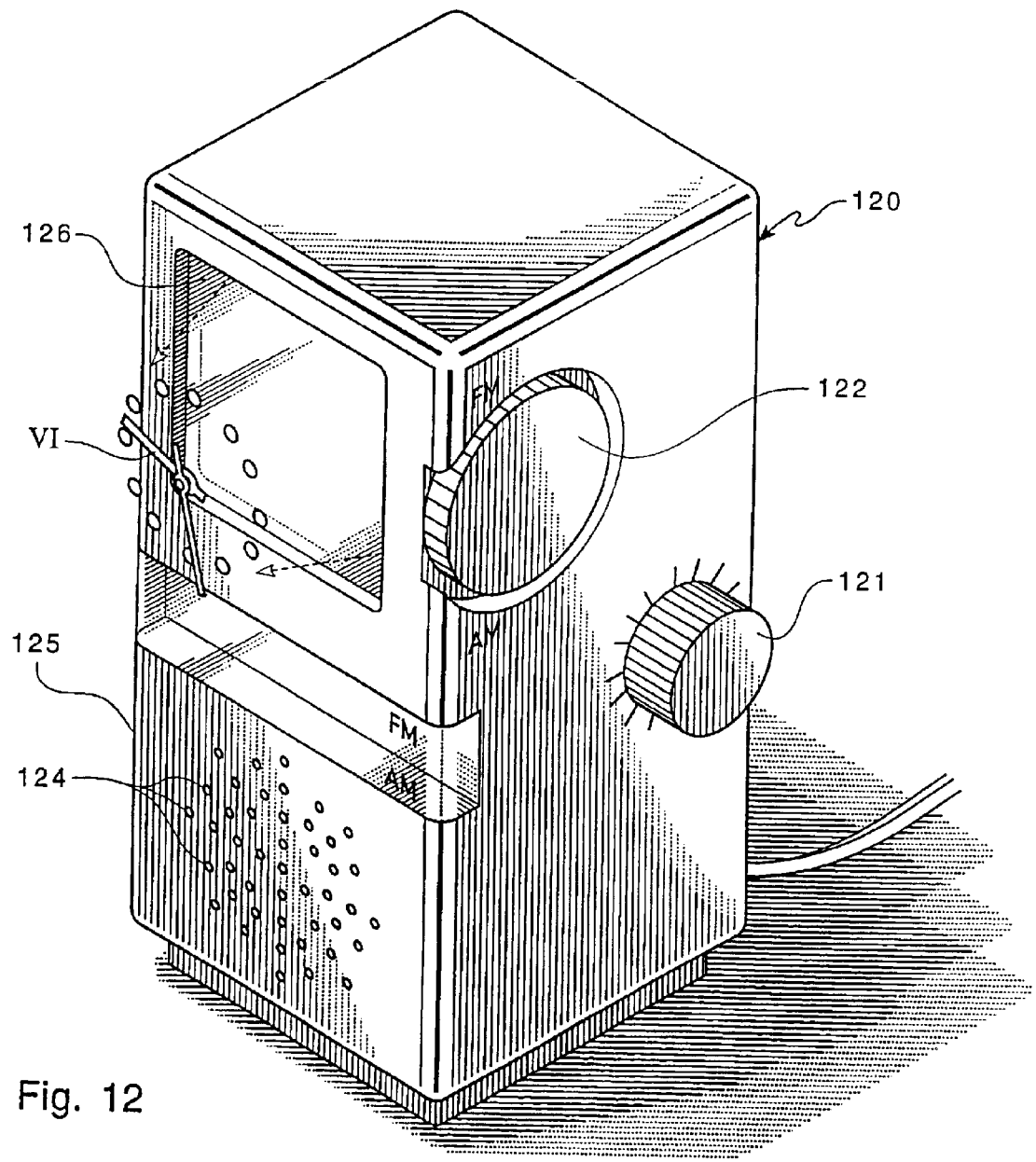
FIG. 12 is an isometric view of a tabletop clock radio incorporating this invention.
Figure 13:
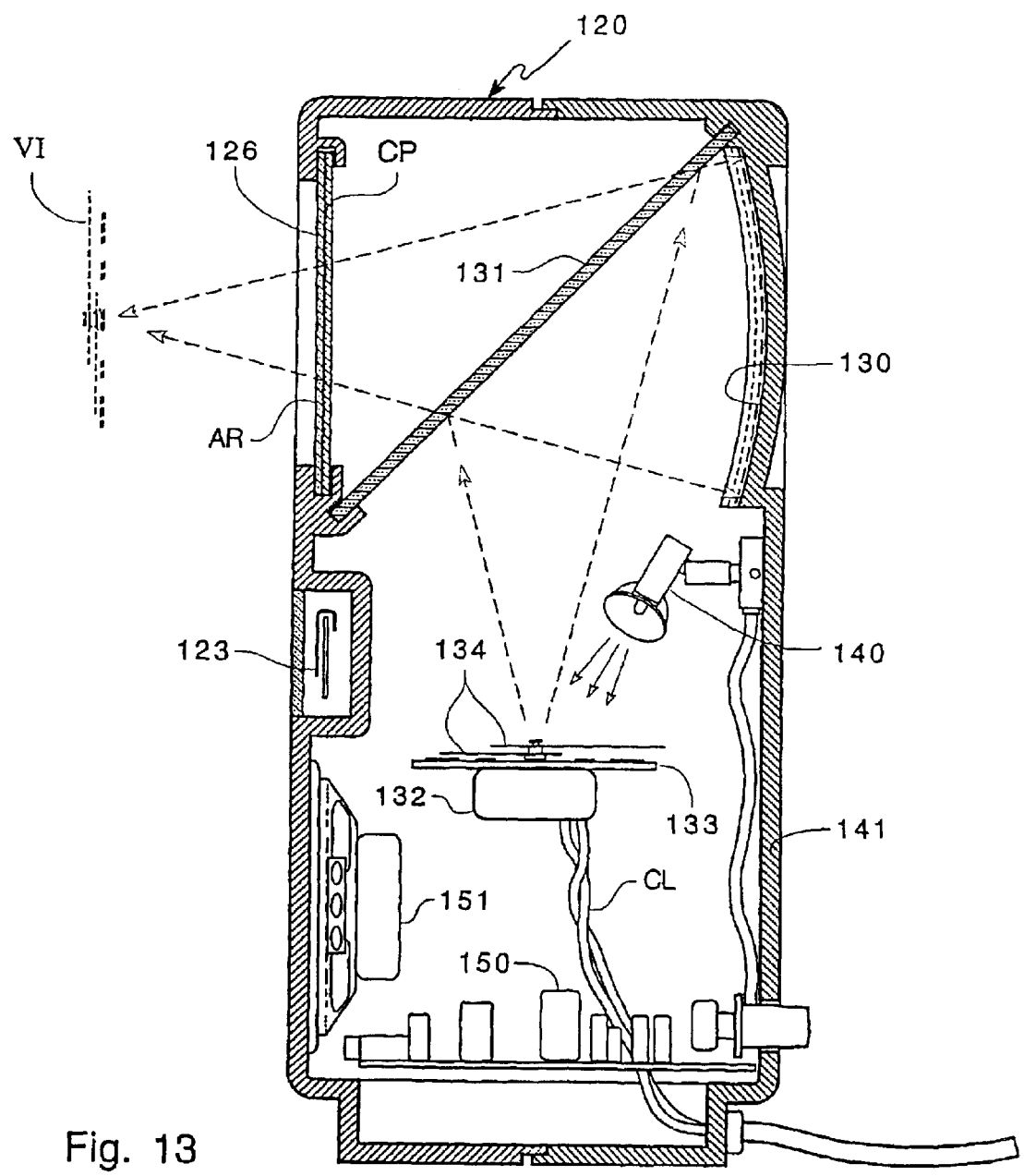
FIG. 13 is a vertical sectional view through a clock radio of FIG. 12.

As is described above in the background of the invention, this invention has application in many fields. FIGS. 12 and 13 illustrate just such an application for home appliances, a bedroom or den clock radio, or for that matter usable in offices as well. The clock radio, generally designated 120, includes the normal radio controls of an ON/OFF switch and volume control 121, a tuning knob 122, and possibly a band selector switch on the near side.

An internal loudspeaker is positioned behind the speaker grill 124 in the form of an array of holes in the case 125. The only departure from conventional clock radios in the appearance is the fact that the normal bezel or cover for the hands is replace by a window 126. The window 126 is not apparently transparent but presents a dark appearance to the observer within the field of view of this invention.

By incorporating this invention, the clock portion of the clock radio 120 appears as the aerial-image VI of a clock face and hands in space in front of the window 126. The aerial-mage VI will be spaced in front of the window and viewable by observers within the viewing angle of the window 126.

Referring now to FIG. 13, it may be seen that the same optical elements found in the embodiments of FIGS. 3 and 4 are present in this clock radio only on a smaller scale. The window 126 exhibits an anti-reflective coating AR on the outer face and a glass laminated circular polarizer CP. This window 126 thereby prevents the viewer from seeing his own image reflected in the window, allows the aerial-image to be transmitted and circularly polarizes any external light that does enter the window and reach the internal concave mirror surface 130 from being reflected back into the room. The mirror 130 is formed as a part of the case 125 and metallized after the molding process in accordance with established metallizing practice.

Within the case 120 at an angle is a partially silvered beamsplitter 131, similar to the beamsplitter 50 of FIGS. 3 and 4. The lower half of the case includes the clock motor 132, with its face 133 and hands 134. Power for the clock motor 132 is supplied via leads CL.

One or more miniature lamps 140 are mounted on the rear wall 141 directed toward the clock face 133 to illuminate the clock face 133 and hands 134. The circuit board and components in the base of the case 125 represent the radio 150; and the loud speaker 151 is shown attached to the front wall of the case 125 behind the grill openings.

Now for a disclosure of another embodiment of this invention, please refer to FIGS. 12 and 13. FIG. 12 is an isometric view of a personal aerial-image display device, such as a tabletop clock radio 120, incorporating the aerial-image optics used in other versions of this invention. A aerial-image VI of clock hands and hour markers 134 of FIG. 13 can be seen floating off the face of the housing or case 125, formed by light rays emerging through window 126. The radio contained within the housing is of conventional design, including an ON-OFF switch and volume control 121, band selector switch (not shown in the drawing) tuning knob 122 appearing in FIG. 12, and tuning indicator 123 appearing in FIG. 13.

FIG. 13 is a vertical sectional view through the personal aerial-image display device 120 of FIG. 12. In FIG. 13, the displayed object is the clock 132 with a face 133 and hands 134 horizontally mounted and illuminated internally by lamp 140.

Light travels vertically upward where it reflects off of a 45-degree beamsplitter horizontally rearward toward to a concave mirror 130 that is molded as part of the housing 141 and metallized. Light, which is focused by and reflects forward from the concave mirror 130, is transmitted through the beamsplitter 131 and through circular polarizing filter CP through front window 126 to form aerial-image VI.

Figure 14:
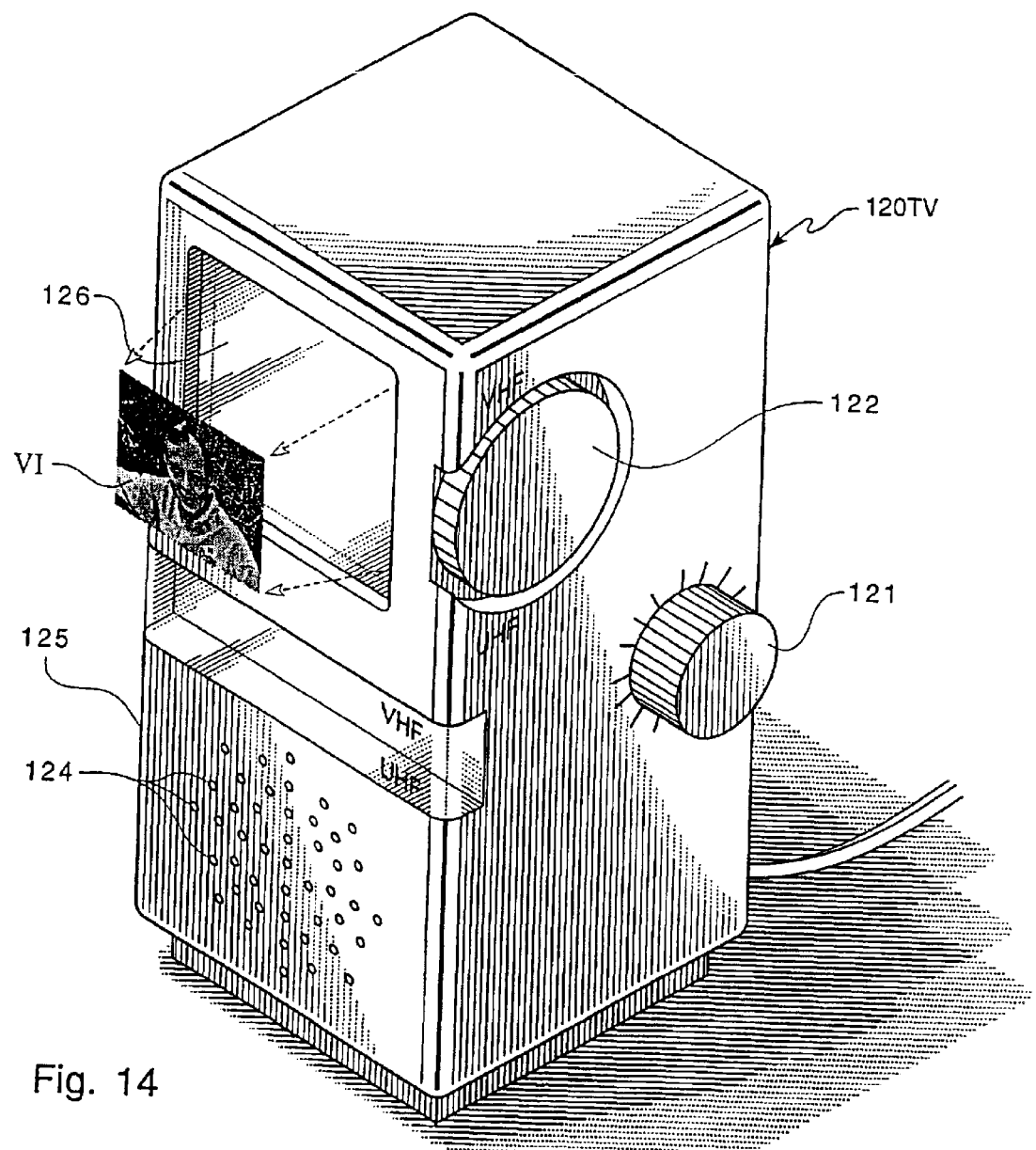
FIG. 14 is an isometric view of a tabletop TV, which includes an aerial-image of the TV screen display utilizing this invention.
Figure 15:
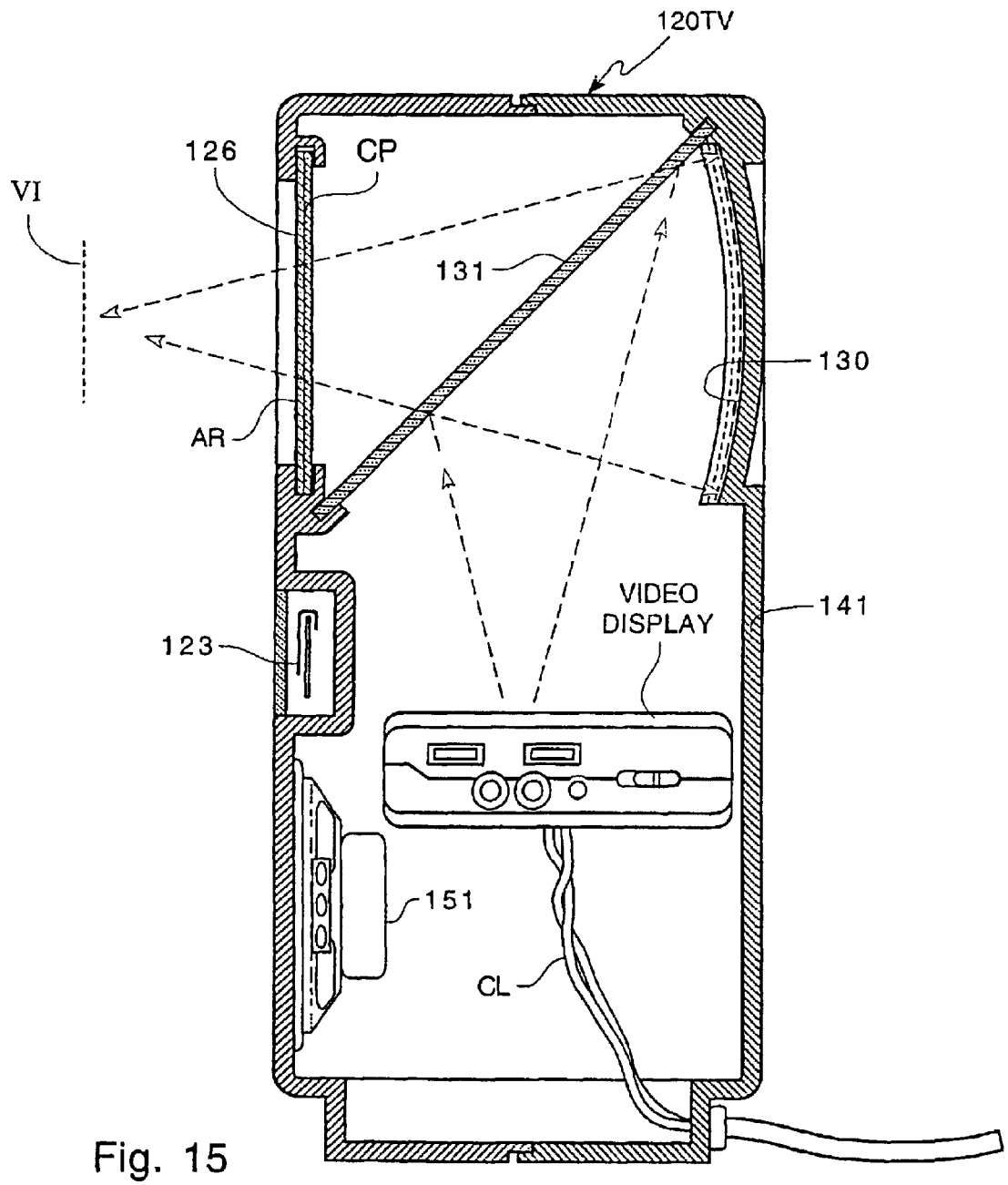
FIG. 15 is a vertical sectional view through the tabletop TV of FIG. 14.

Still another embodiment of this invention may be seen in FIGS. 14 and 15. FIG. 14 is an isometric view of a personal aerial-image display device, such as a tabletop television 120TV, incorporating the aerial-image optics used in other versions of this invention. A aerial-image VI of the liquid crystal display (LCD) television screen of FIG. 15 can be seen in FIG. 14 floating off the face of the television set 120TV, formed by light rays emerging through window 126.

FIG. 15 is a vertical sectional view through the personal aerial-image display device of FIG. 14. In FIG. 15, the displayed object is the video display, which has built-in illumination. Light travels vertically upward where it reflects off of a 45-degree beamsplitter horizontally rearward toward to a concave mirror 130 which, similar to the radio embodiment of FIGS. 12 and 13, is molded as part of the housing 141 and metallized. Light, which is focused by and reflects forward from, the concave mirror 130 is transmitted through the beamsplitter 131 and through circular polarizing filter CP through front window 126 to form aerial-image VI.

This display may be any type of video display, such as a cathode ray tube (CRT), a liquid crystal display (LCD), or such newer displays which become available, such as the organic light-emitting diode (OLED) display.

Figure 16:
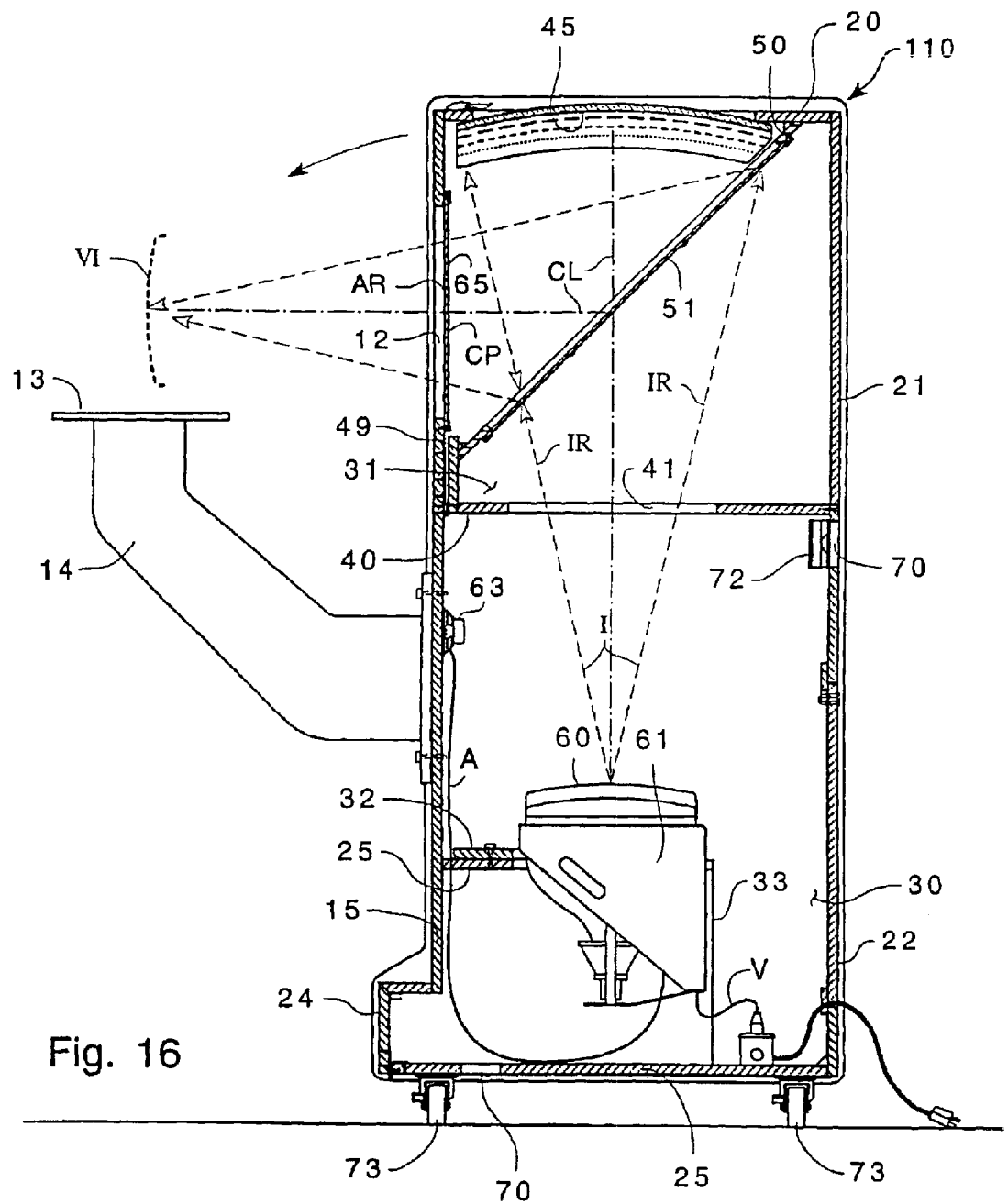
FIG. 16 is a vertical sectional view through the housing of FIG. 1 showing a downward-facing concave mirror as a part of another embodiment.
Figure 17:
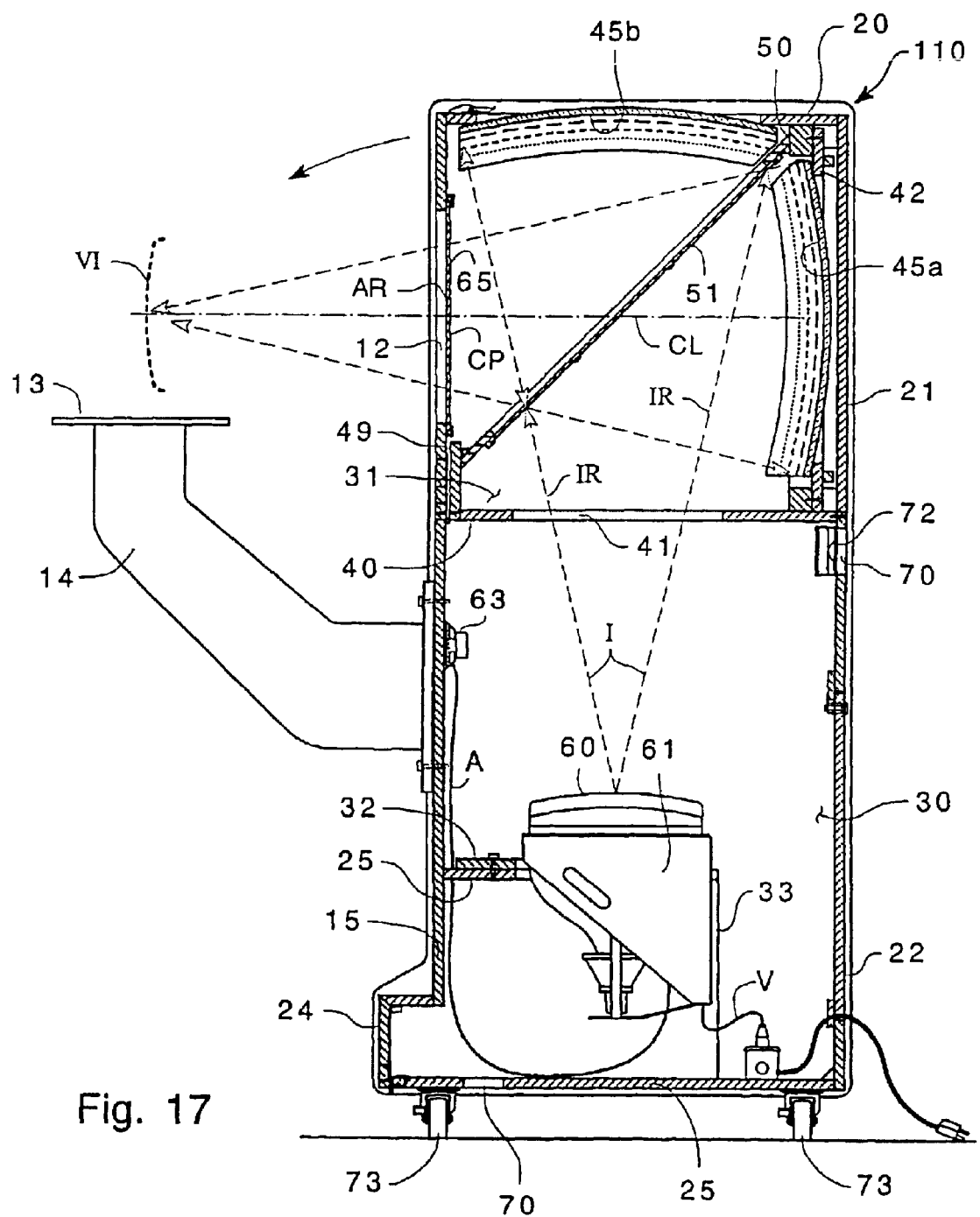
FIG. 17 is a vertical sectional drawing through the housing of FIG. 1 showing two concave mirrors for improved brightness of this invention.

Illustrating some of the versatility in design of this invention are FIGS. 16 and 17. FIG. 16 is a vertical section drawing through the housing of FIG. 1, showing a video monitor 60 as an image source, with one concave mirror facing downward rather than facing the window as in the previous embodiment.

In a previous version, FIGS. 2–4 and 12, only one concave mirror was used to form the image. In this system, light traveling upward from the object 60 is transmitted through the 45 degree beamsplifter upward toward concave mirror 45, which reflects it downward to be reflected off the 45-degree beamsplifter forward through the window or opening 12 and circular polarizing filter to form the floating image (aerial-image) VI.

FIG. 16 illustrates that the concave mirror has at least two different candidate locations to accommodate different housing limitations, while maintaining the same optical properties as the embodiment of FIGS. 2–4.

Where image brightness is an important factor, the embodiment of the invention shown in FIG. 17 becomes the preferred embodiment. FIG. 17 is a vertical section drawing through the housing 125 of FIG. 1 showing a video monitor 60 as an image source, and with two concave mirrors 45a and 45b to double the brightness of the display. In previous versions, FIGS. 2–4 and 12, only one concave mirror was used to form the image; however, FIG. 17 shows two mirrors in optically equivalent positions which cooperate to relay the image out in space. In the case of forward-facing mirrors 45a, light goes vertically upward from the object 60, reflects off the 45-degree beamsplitter horizontally rearward toward concave mirror 45a, which reflects it horizontally forward through the beamsplitter 51, window 12, and circular polarizing filter to form the floating image (aerial-image) VI.

In the case of concave mirror 45b, light goes vertically upward from the object 60, is transmitted through the 45 degree beamsplifter 51, upward toward concave mirror 45b, which reflects it downward to be reflected off the 45-degree beamsplitter forward through the window 12 and circular polarizing filter to form the floating image (aerial-image) VI. In the previously described designs of FIGS. 2–4 and 12, this light would have been lost and absorbed in the black underside of the top 20 of the housing 110.

Figure 18:
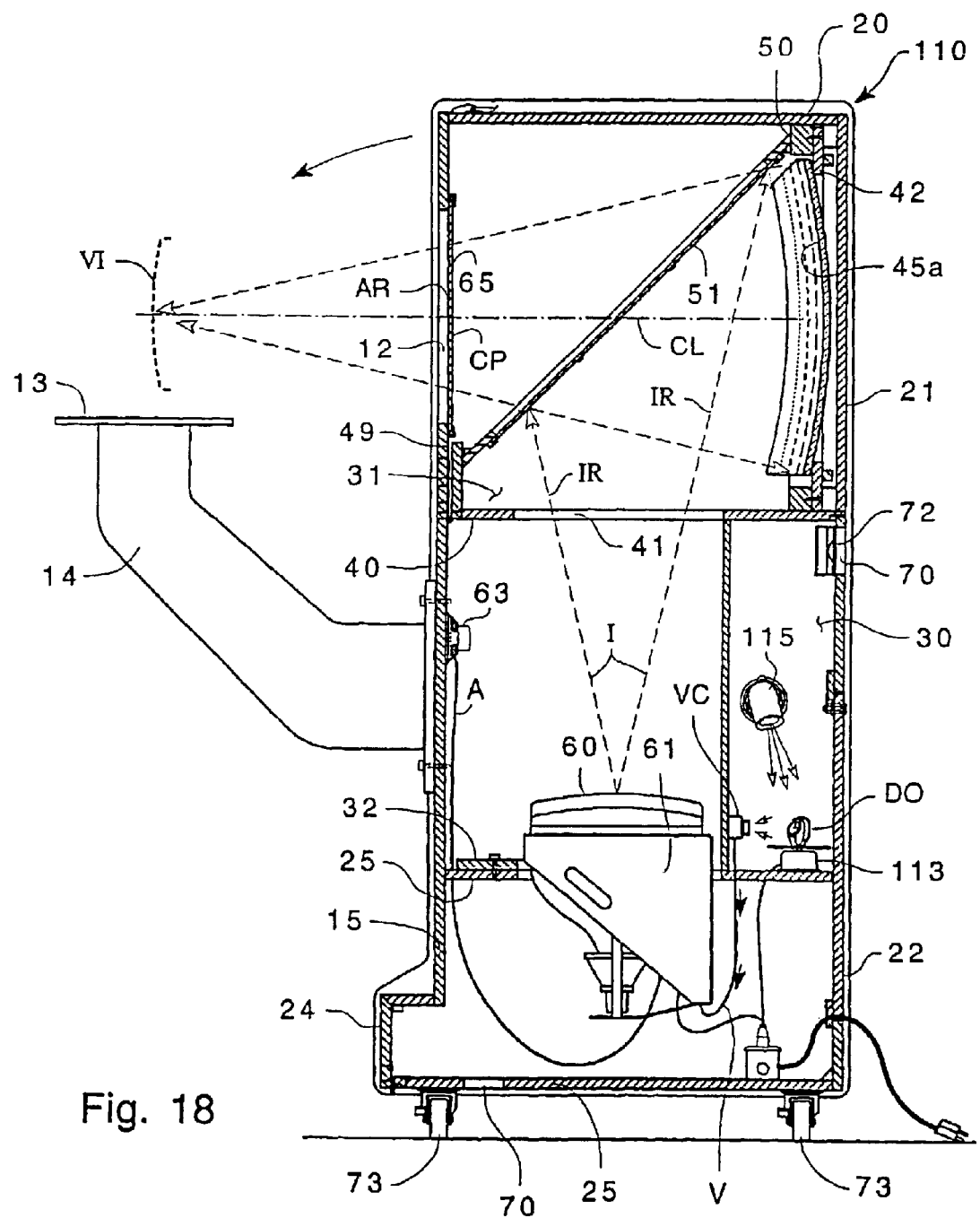
FIG. 18 is a vertical sectional view through a video display in which a video camera is incorporated to photograph small objects.

FIG. 18 solves the problem encountered by retail merchants who want to display objects, such as jewelry, which are physically too small to be seen effectively from a distance. FIG. 18 is a vertical section view through a video version of an aerial-image display 110, in which there is a section where a small video camera VC is position to photograph small objects DO on miniature turntable 113, and illuminated by light source 115, all of which is light baffled in a separate chamber from the video display.

In operation, the merchant removes the rear access door 22 and places the displayed object DO on the turntable 113 and replaces door 22. The video camera is pre-focused on the middle of the turntable 113 where the displayed object DO is placed. The video signal from the camera VC goes to the video monitor 61 that displays a large image, which is relayed to position VI by the same optics as is used in the embodiments of FIGS. 2–4 and 16 or 17.

Figures 19, 19A:
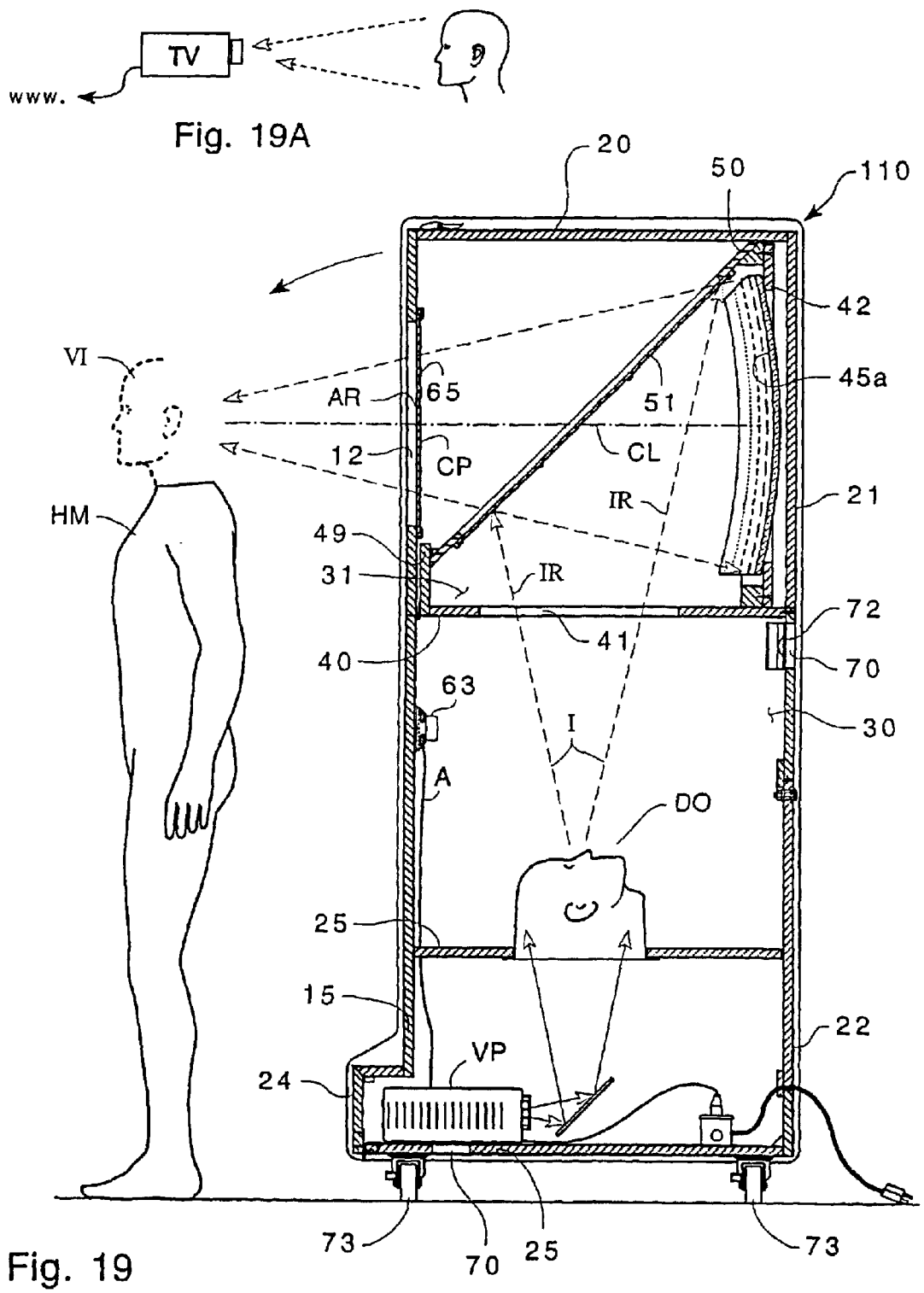
FIG. 19 is a vertical sectional view through a display showing a talking head projecting an image from a VCR or streaming media from, as an example, dedicated web site on the internet.

In the case where a human illusion is desired, the embodiment of FIG. 19 is recommended. FIG. 19 is a vertical sectional view through an aerial-image display 110 showing an illusion to create a talking head at aerial-image position VI. The optics using beamsplitter 51, and concave mirror 45a, and circular polarizing filter CP are as described before. A molded head is the displayed object DO. This head can be translucent and back projected with a video image from video projector VP as shown, or opaque and front projected by a video projector (not shown). In the preferred configuration as shown, the head DO is molded or vacuum formed, translucent plastic without much detail in the facial features. This makes the generic head more adaptable to having a variety of people's faces projected onto the back side of the molded head, which acts like a rear-projection screen.

The video image can come from an internal VCR (shown in FIG. 3); however, this video-projector version has the advantage of being able to project streaming video and audio from a dedicated internet web site. In a situation where a large chain store operation would have displays in many chain stores or fast-food restaurants, the video image of a celebrity or recognizable character (FIG. 19A) could be video projected onto the molded face, which would be relayed optically outside of the display. This gives the sponsor the opportunity to change the video message, or the person, at any time from their headquarters. To enhance the illusion, a headless mannequin HM, appropriate garbed, can be placed in front of the aerial-image housing 110 to complete the human figure. If the head DO is of flexible material, including opening lips, the head may be synchronized with audio, which can make the human figure appear life-like while speaking.

As an alternative, as illustrated in FIG. 19, in combination with FIG. 19A, it is possible to employ a live actor in front of a video camera speaking the lines, which constitutes the audio channel that may communicate with the aerial display of FIG. 19 via a suitable communication channel which may be any of a number of dedicated channels or may be via the Internet as indicated by the "www." indication on the TV cable of FIG. 19A.

Figure 20:
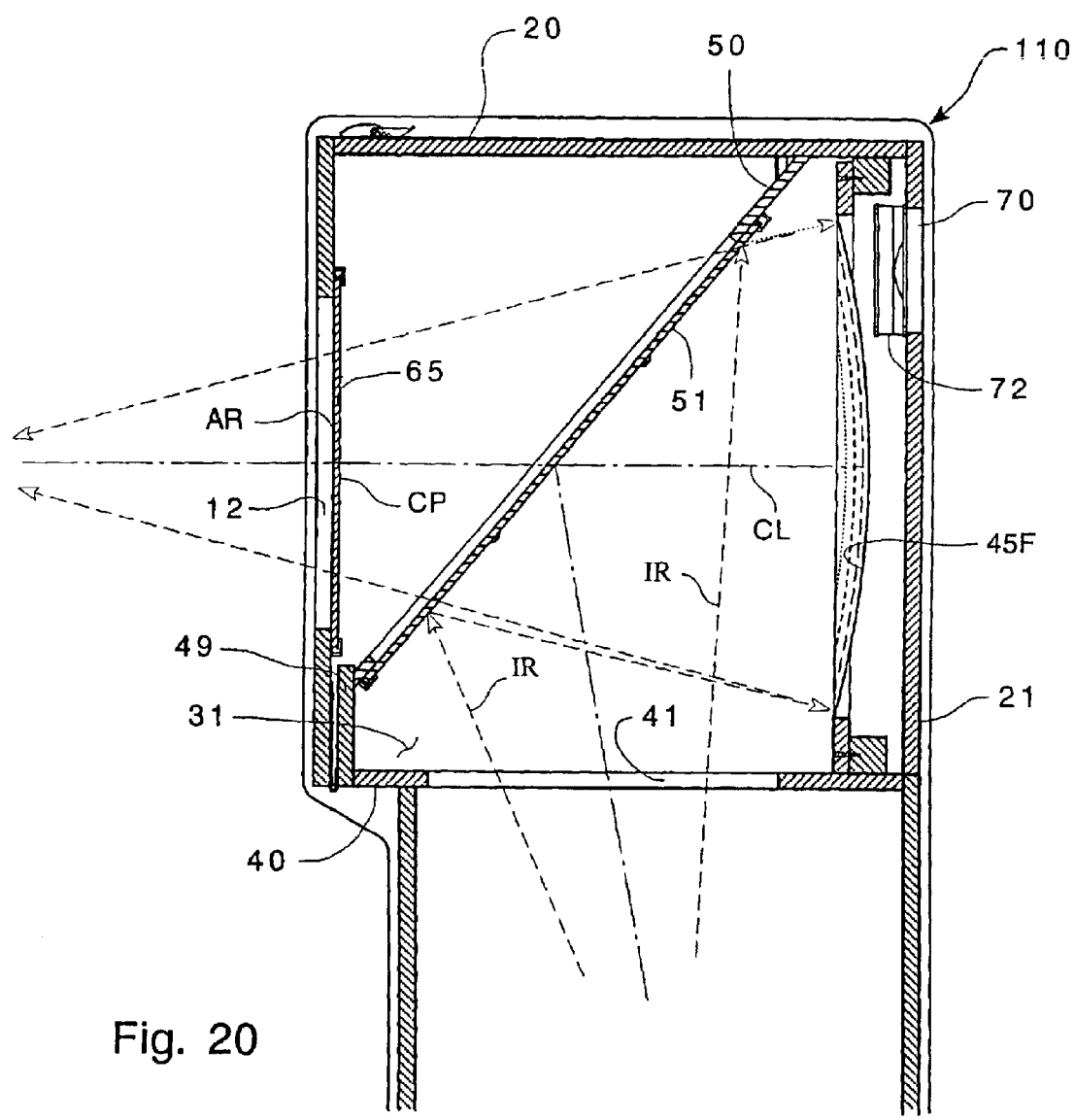
FIG. 20 is an alternate mirror configuration where the concave mirror is a flexible, metallized film mirror.
Figure 21:
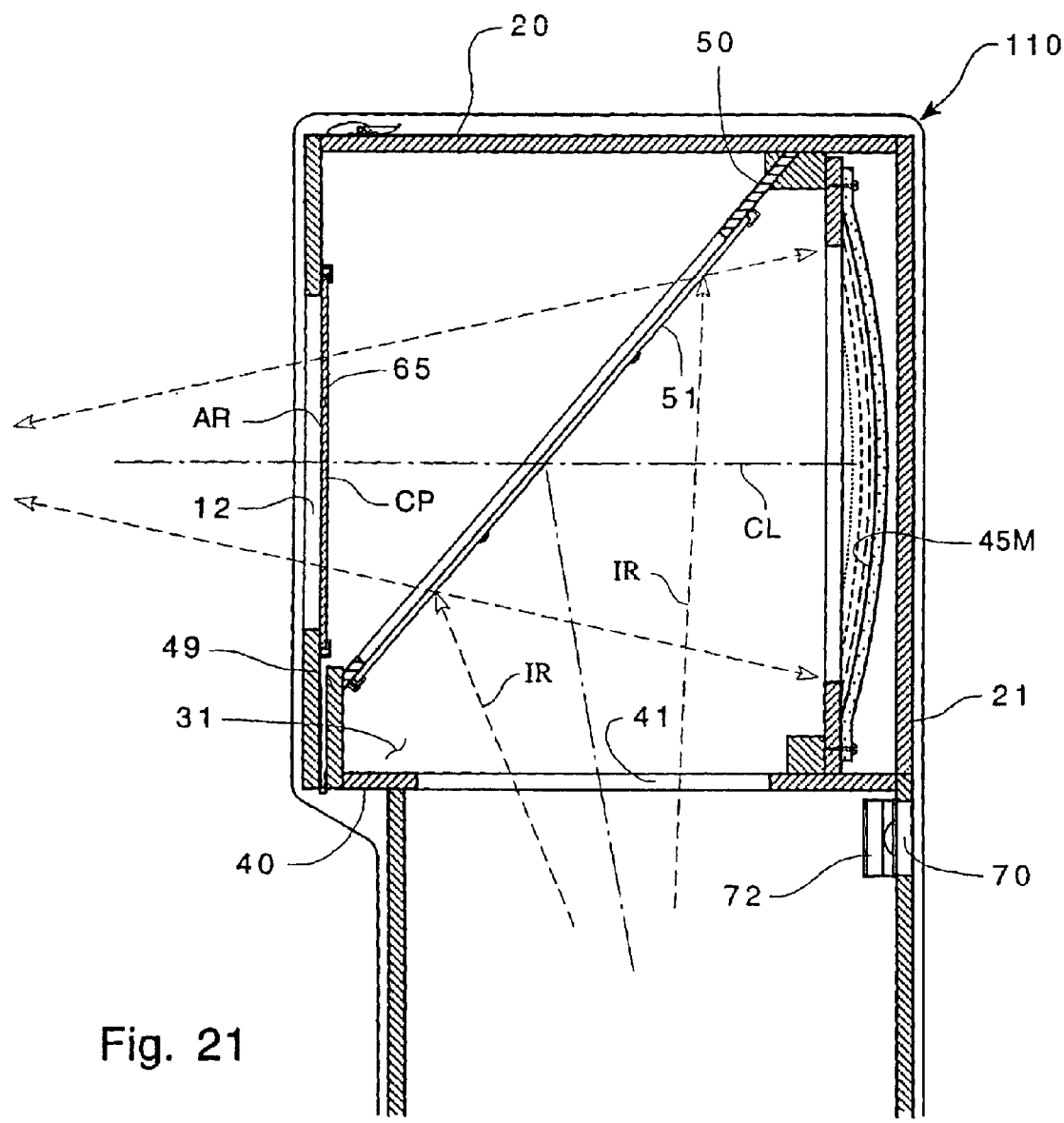
FIG. 21 is an alternate mirror configuration using a molded plastic concave mirror.

FIGS. 20 and 21 illustrate alternate forms of concave mirrors that may be used in carrying out this invention. FIG. 20 is an alternate mirror construction where the concave mirror 45 is made from a thin membrane or sheet 45F of aluminized film, such as the polyester material sold by the The DuPont Co. under the trademark Mylar™. The Mylar™ mirror can be pulled into a concave curve, nominally a partial spherical shape, by an exhaust fan 70 shown in an otherwise sealed chamber behind the film sheet 45, or pushed into shape with a pressurizing fan (not shown), but otherwise located on the front (concave) side of the mirror 45F. This film mirror 45F has an advantage of being very lightweight and inexpensive, as compared with many mirrors of the size and quality required.

FIG. 21 is an alternate mirror configuration where the concave mirror 45M is a molded plastic, concave shape, that has been coated with aluminum or other bright metal to form a mirror surface. Plastic mirrors are lighter weight, for the same thickness, and less susceptible to breakabe than glass mirrors.

Figure 22:
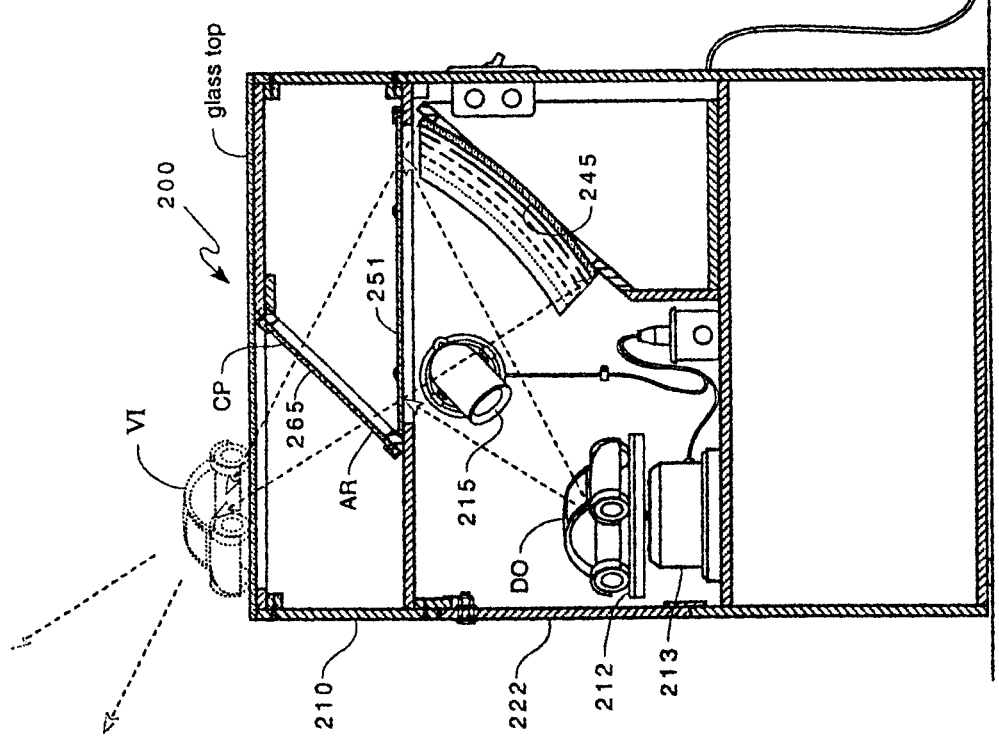
FIG. 22 shows a glass-topped display case or housing for use in retail stores.
Figure 1:
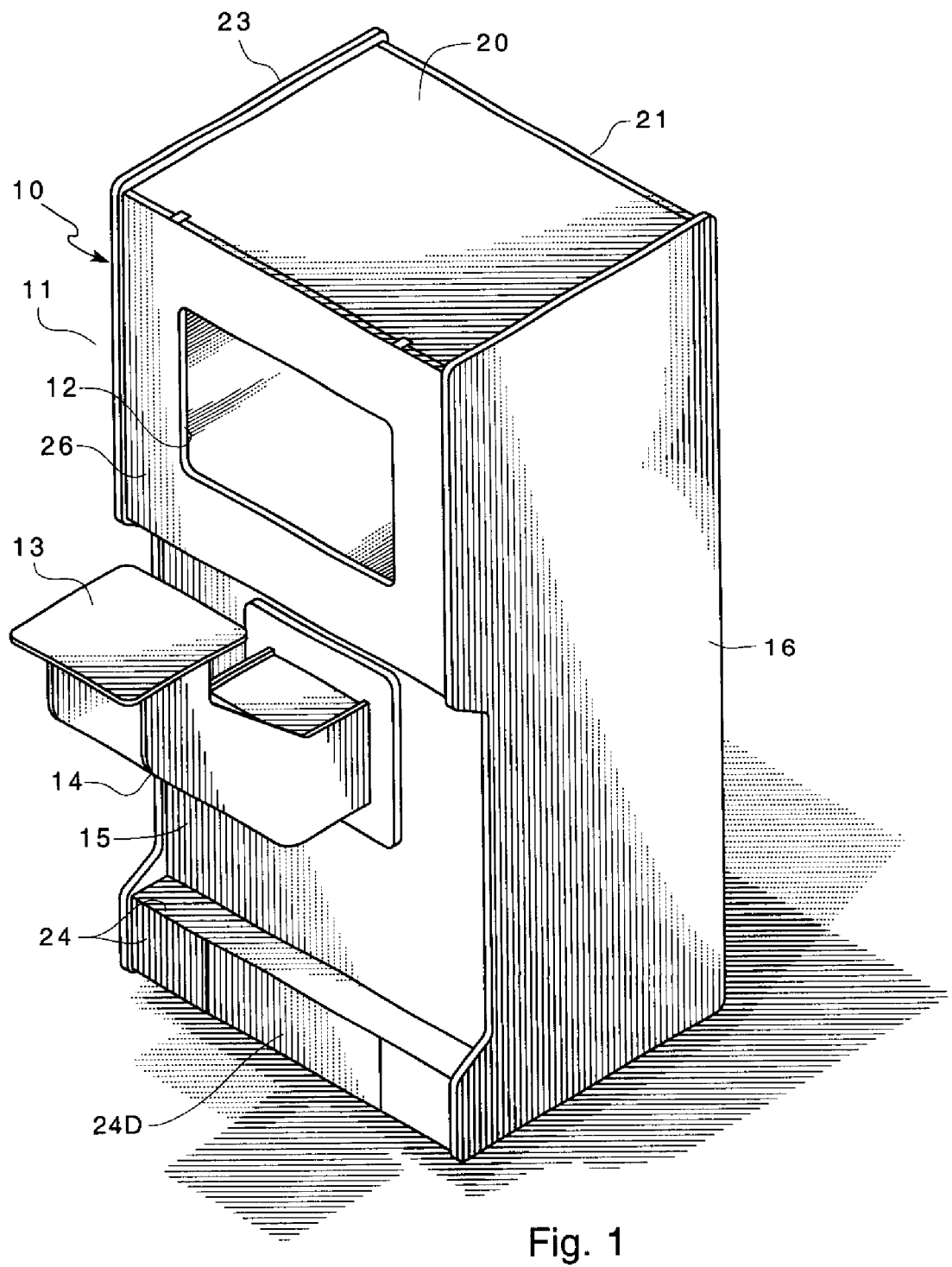
Figure 2:
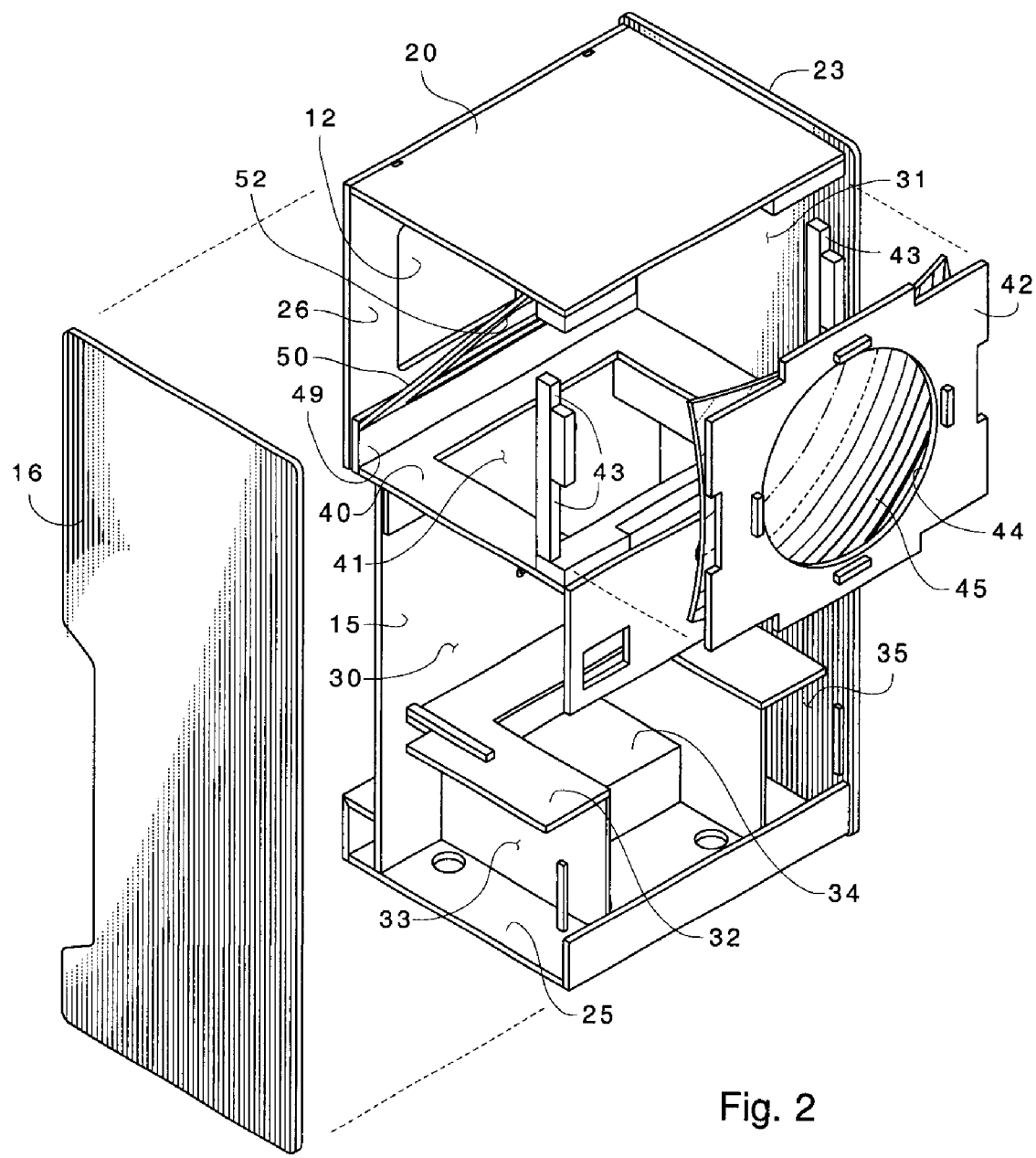
Figure 3:
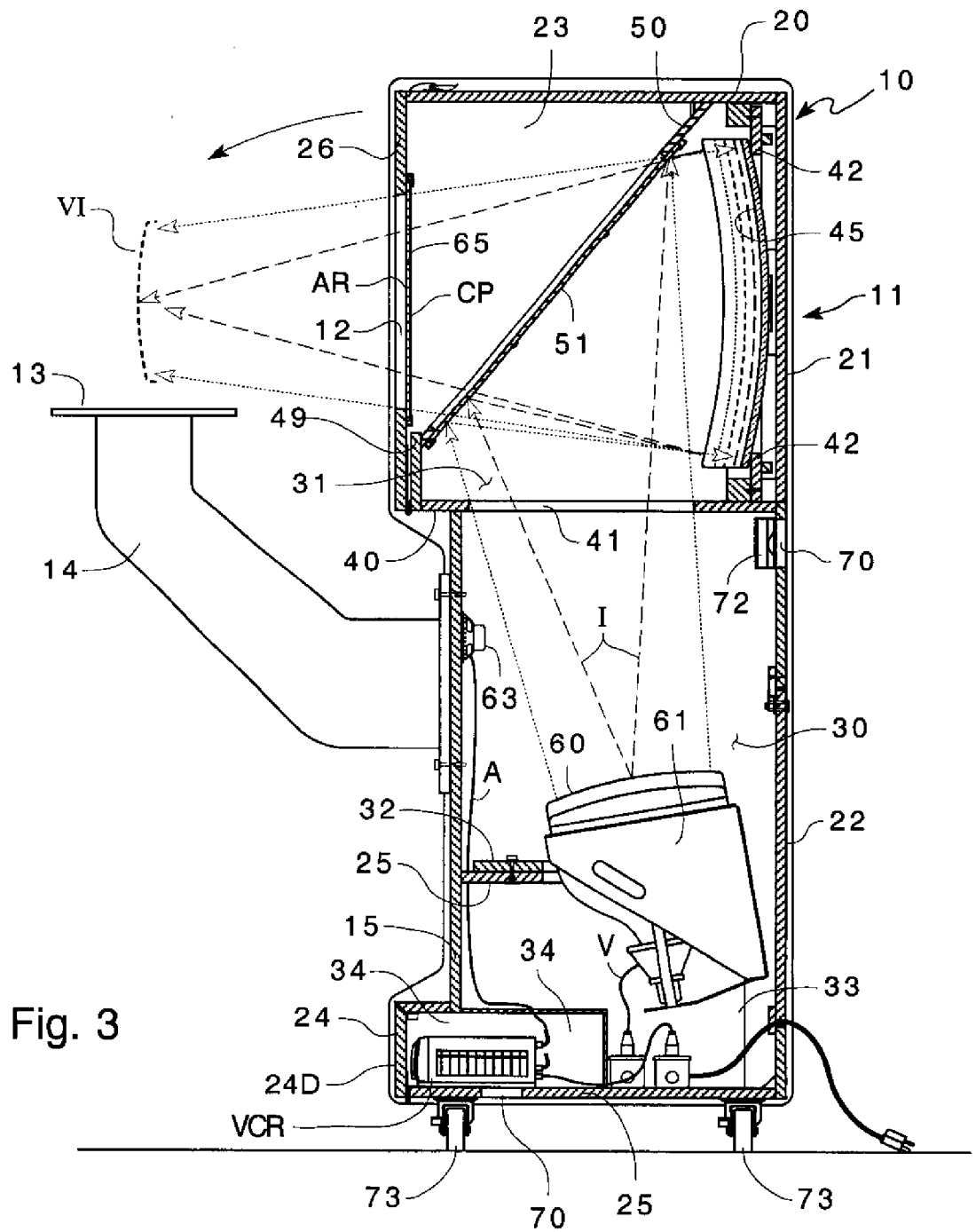
Figure 4:
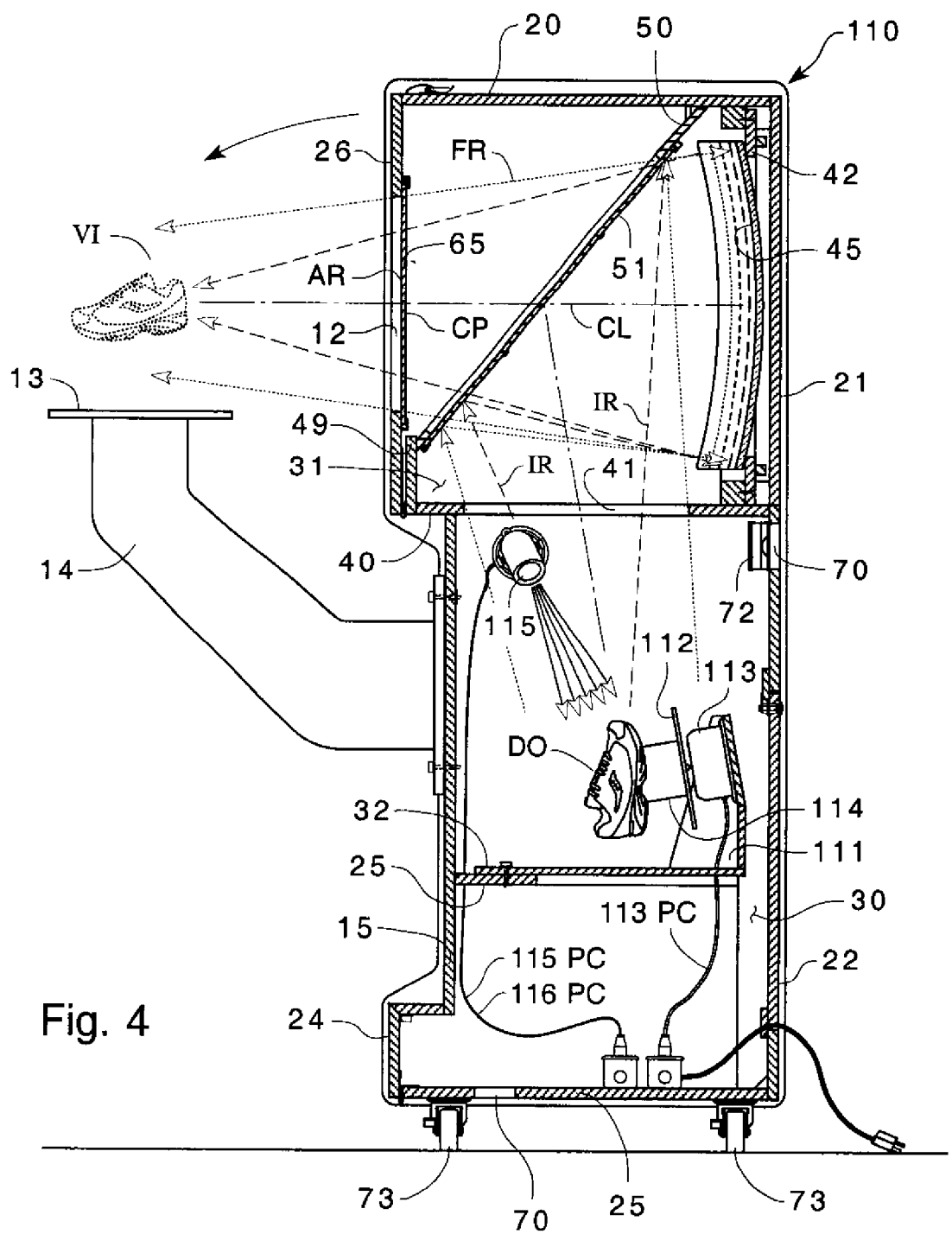
Figure 5:
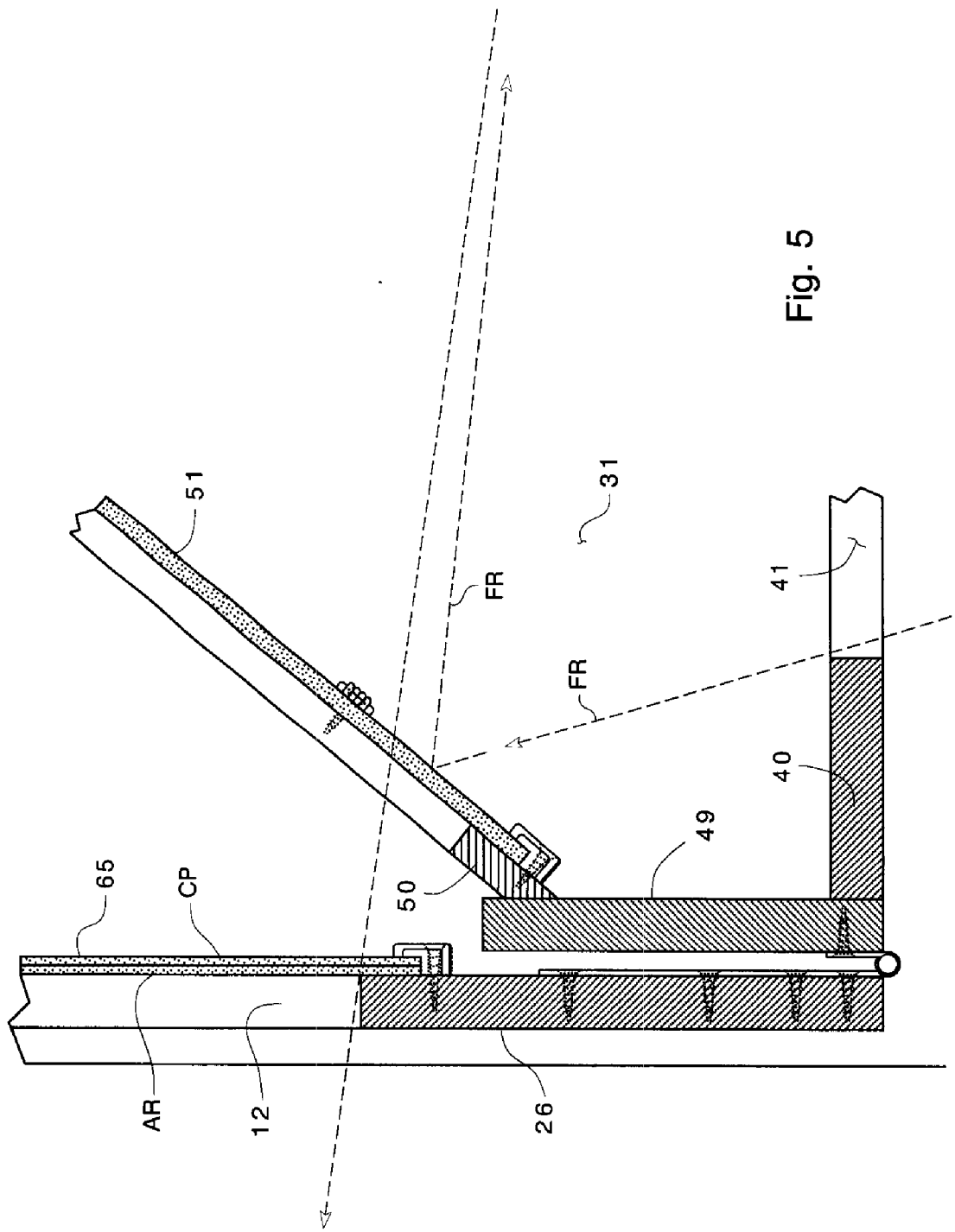
Figure 6:
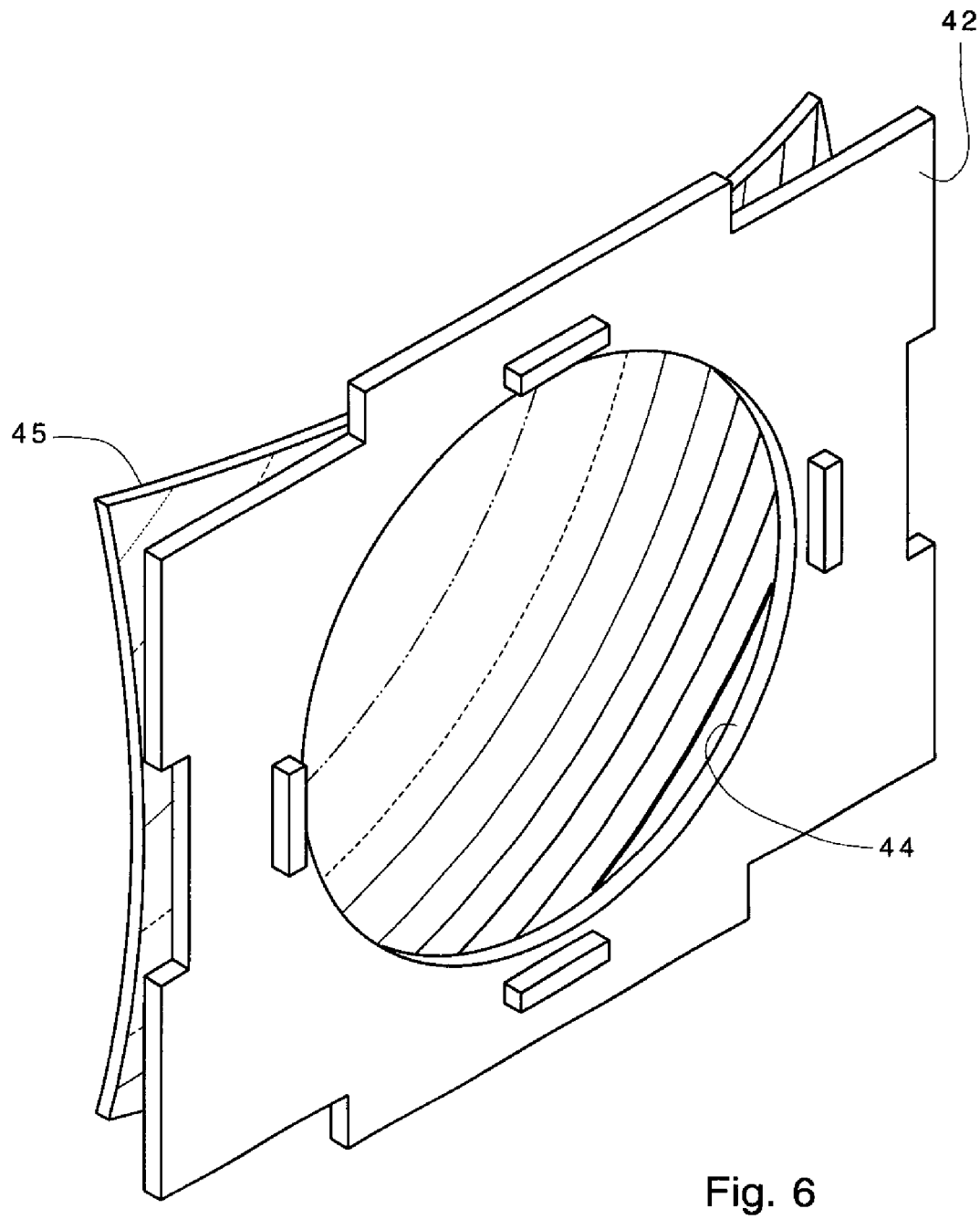
Figure 9:
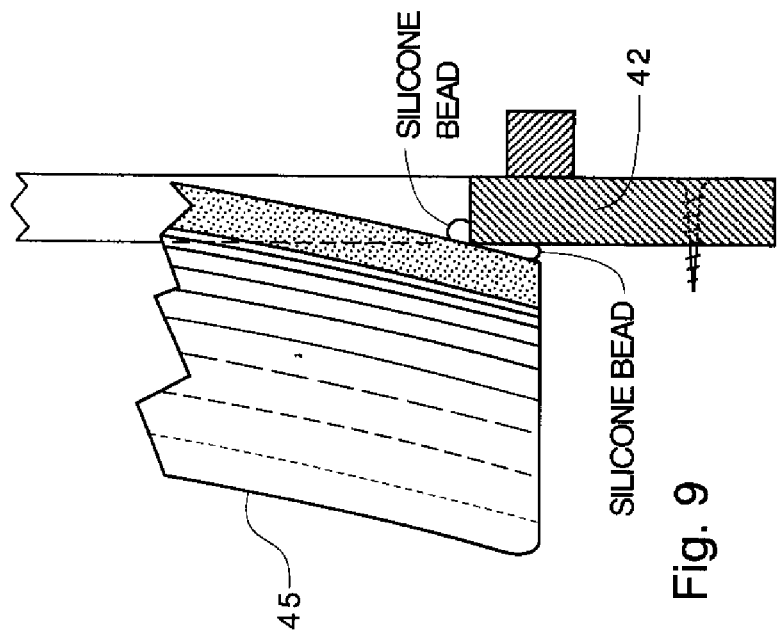
Figure 7:
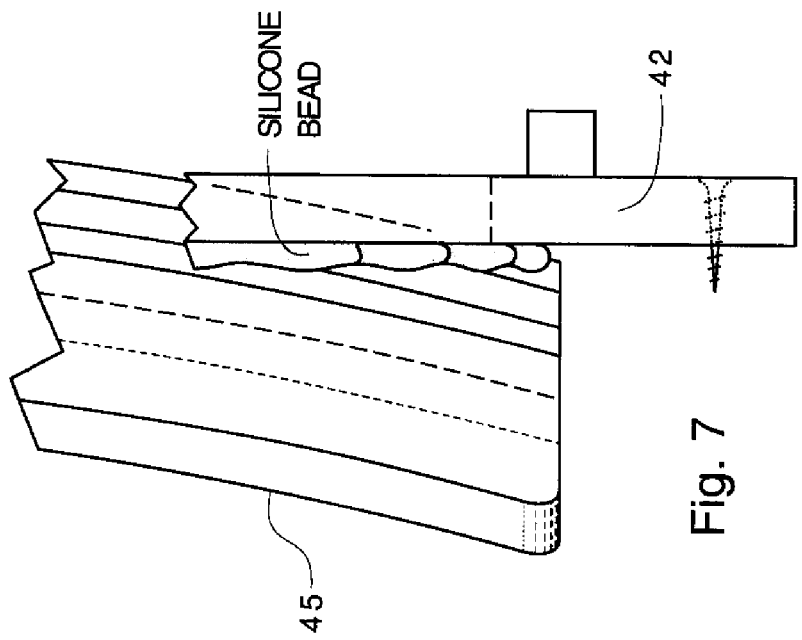
Figure 8:
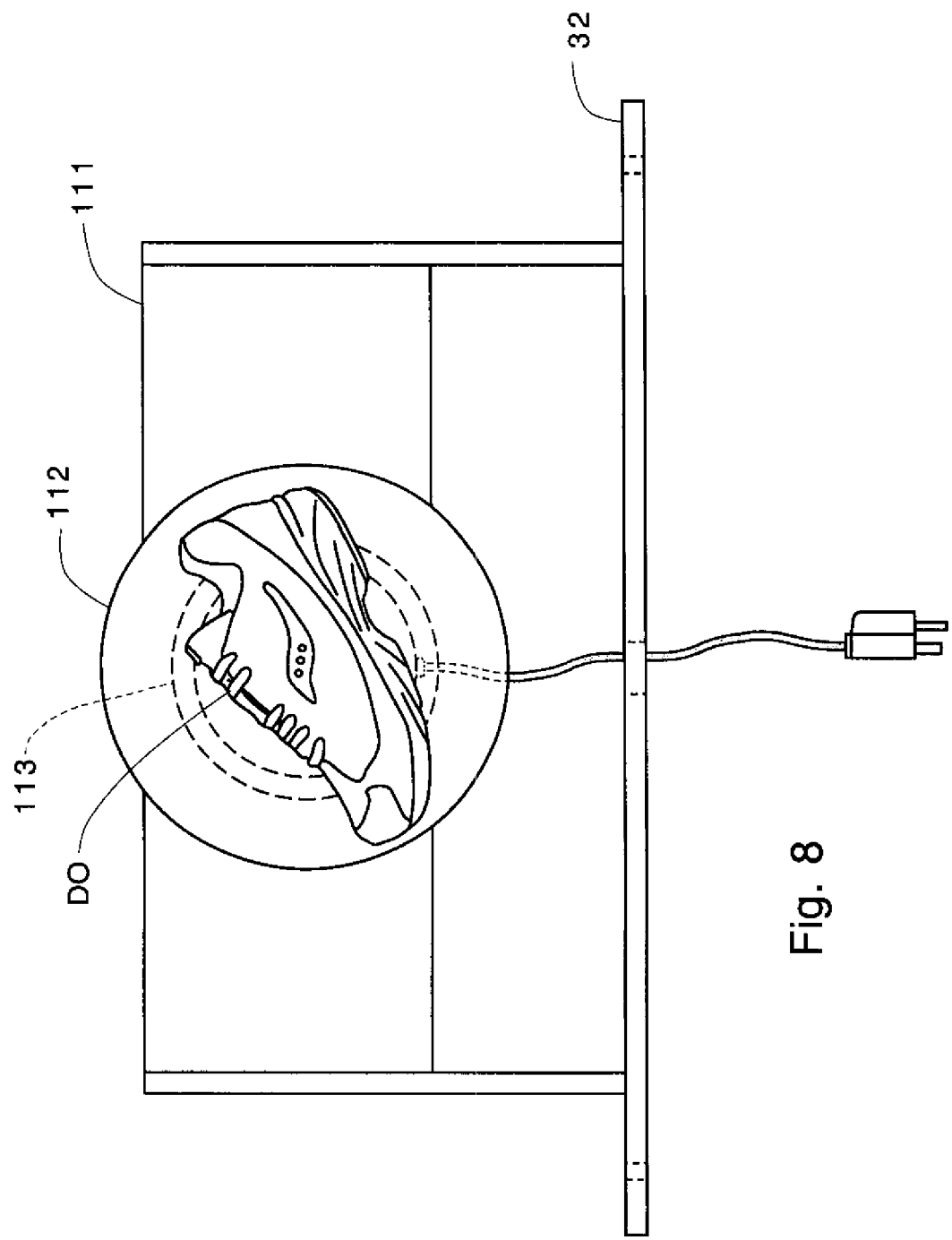
Figure 10:
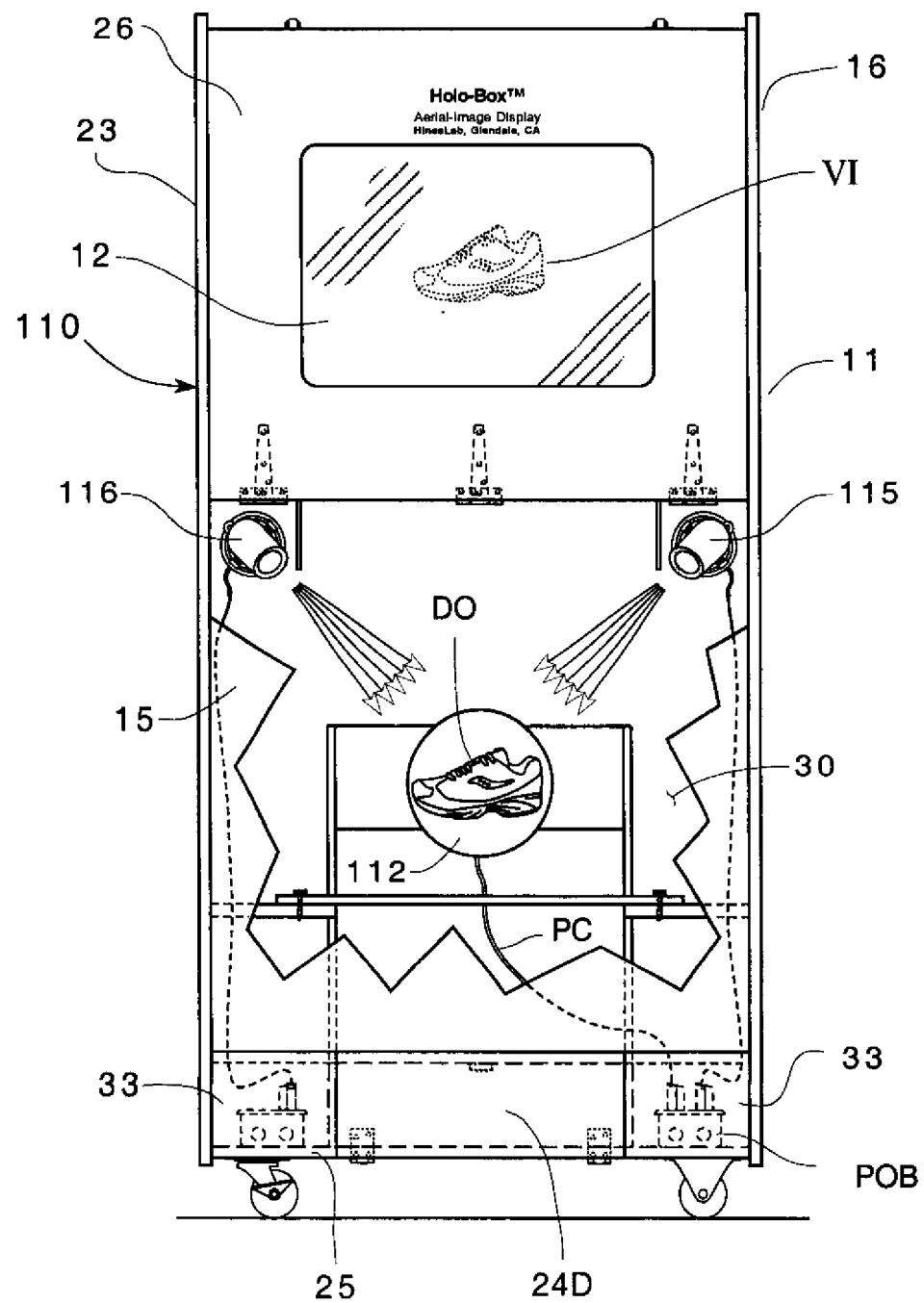
Figure 11:
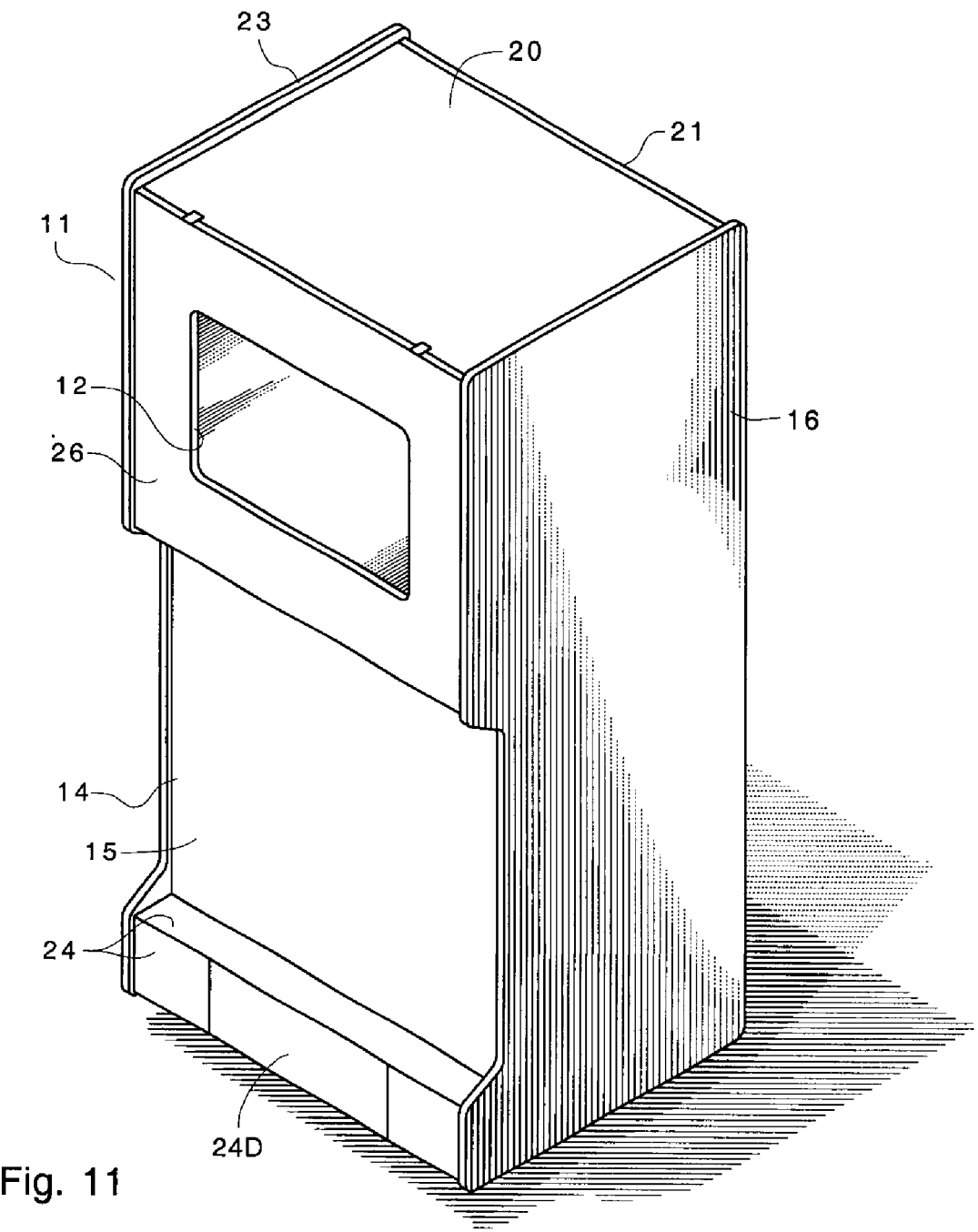
Figure 12:
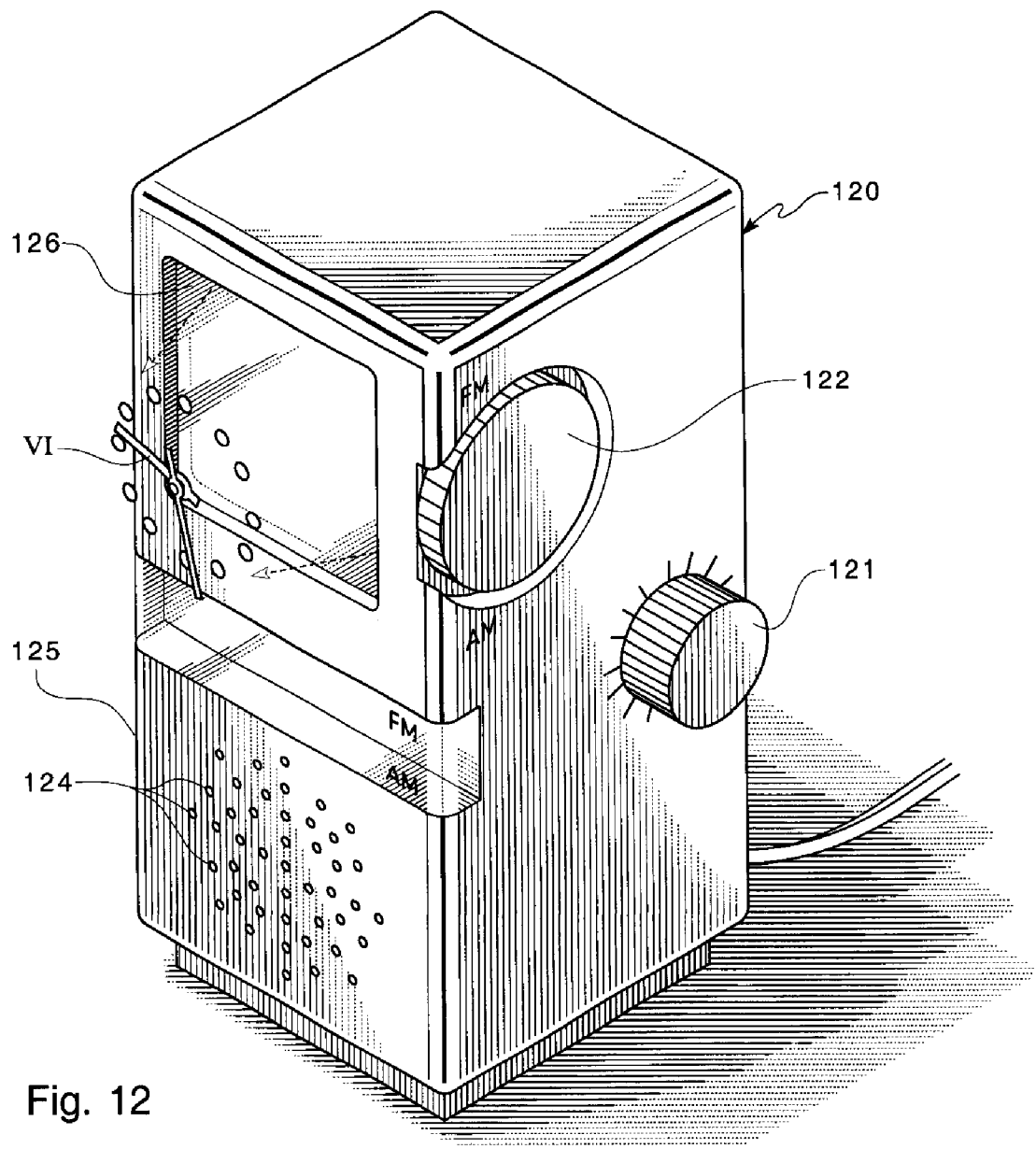
Figure 13:
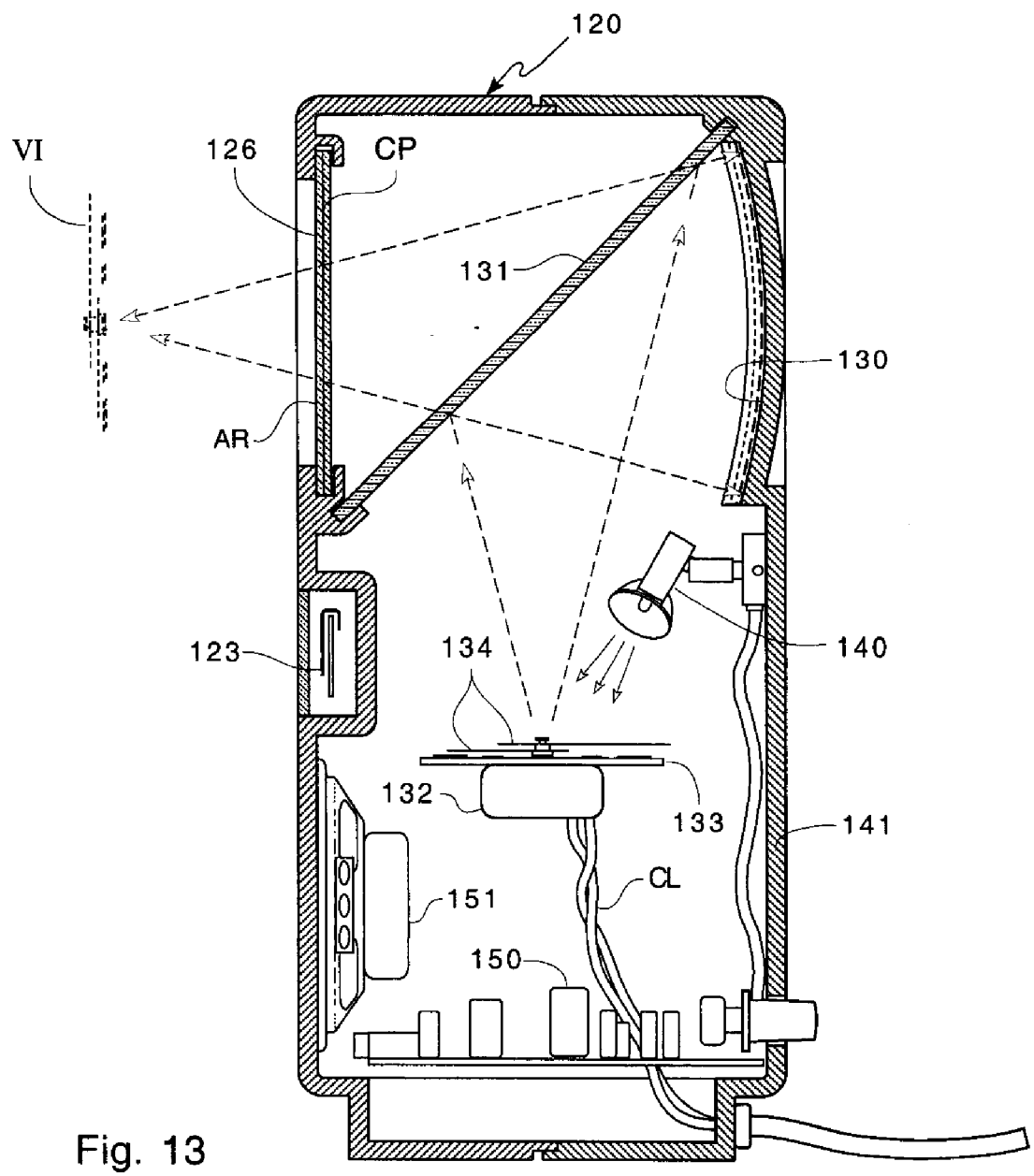
Figure 14:
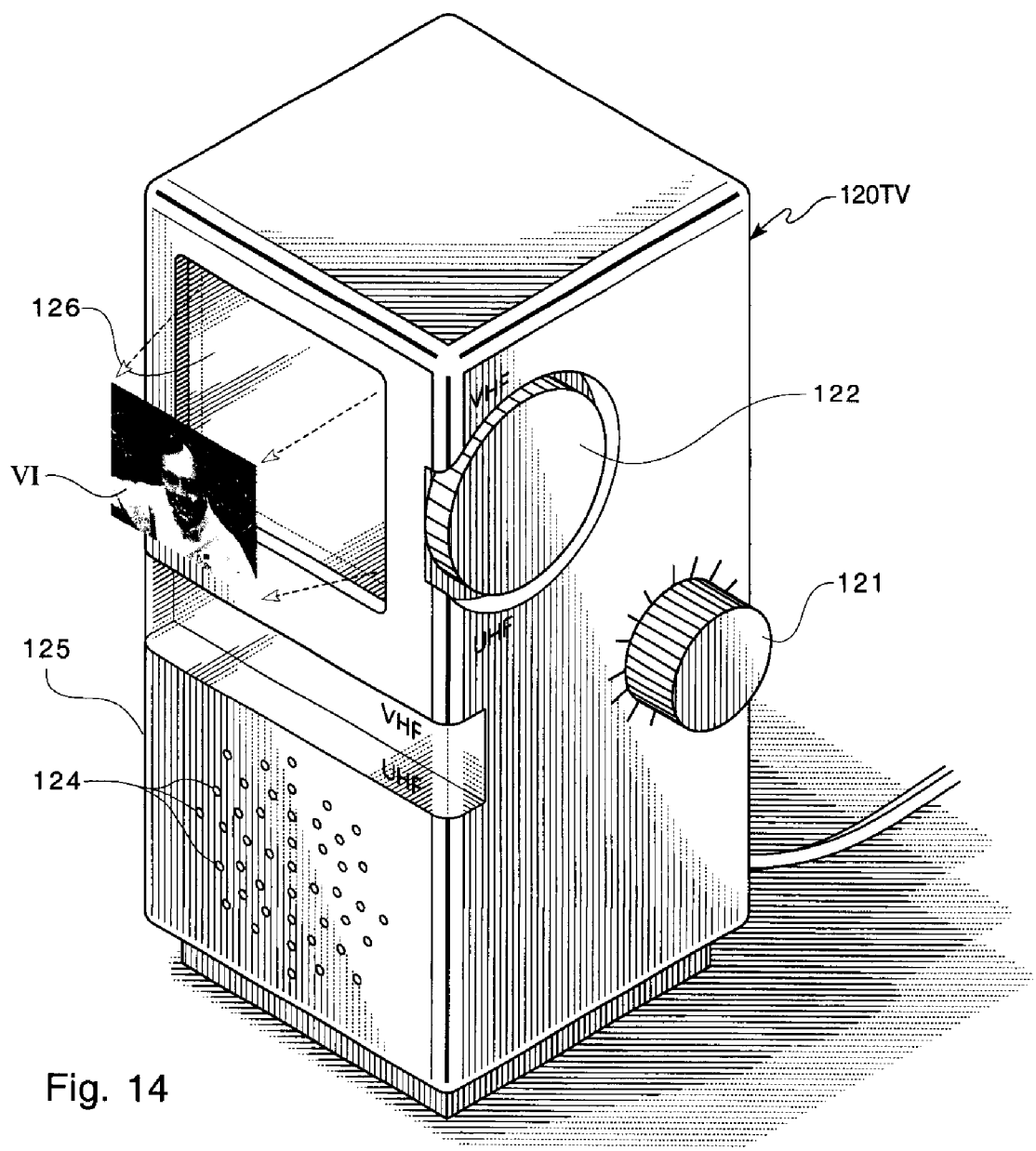
Figure 15:
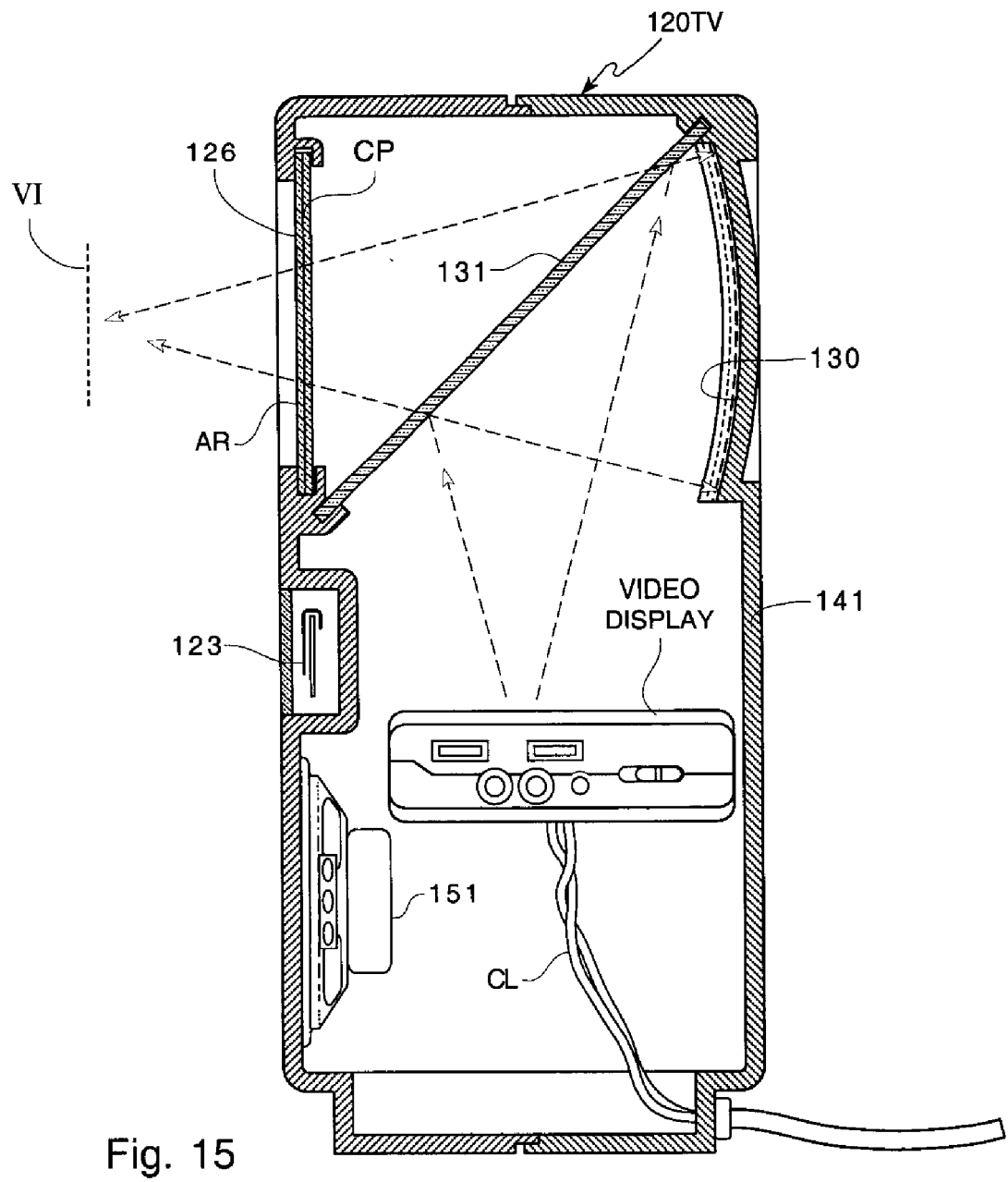
Figure 16:
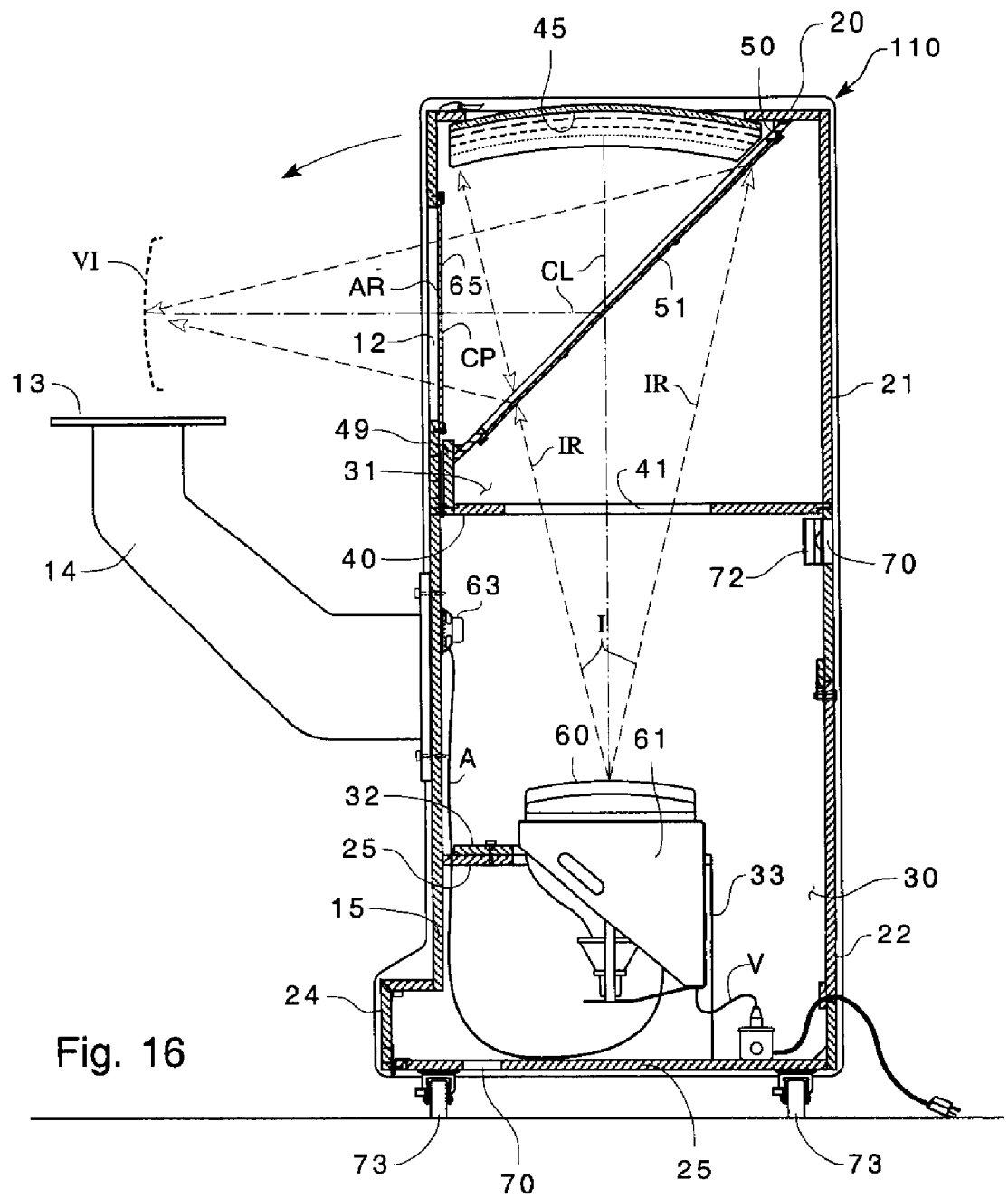
Figure 17:
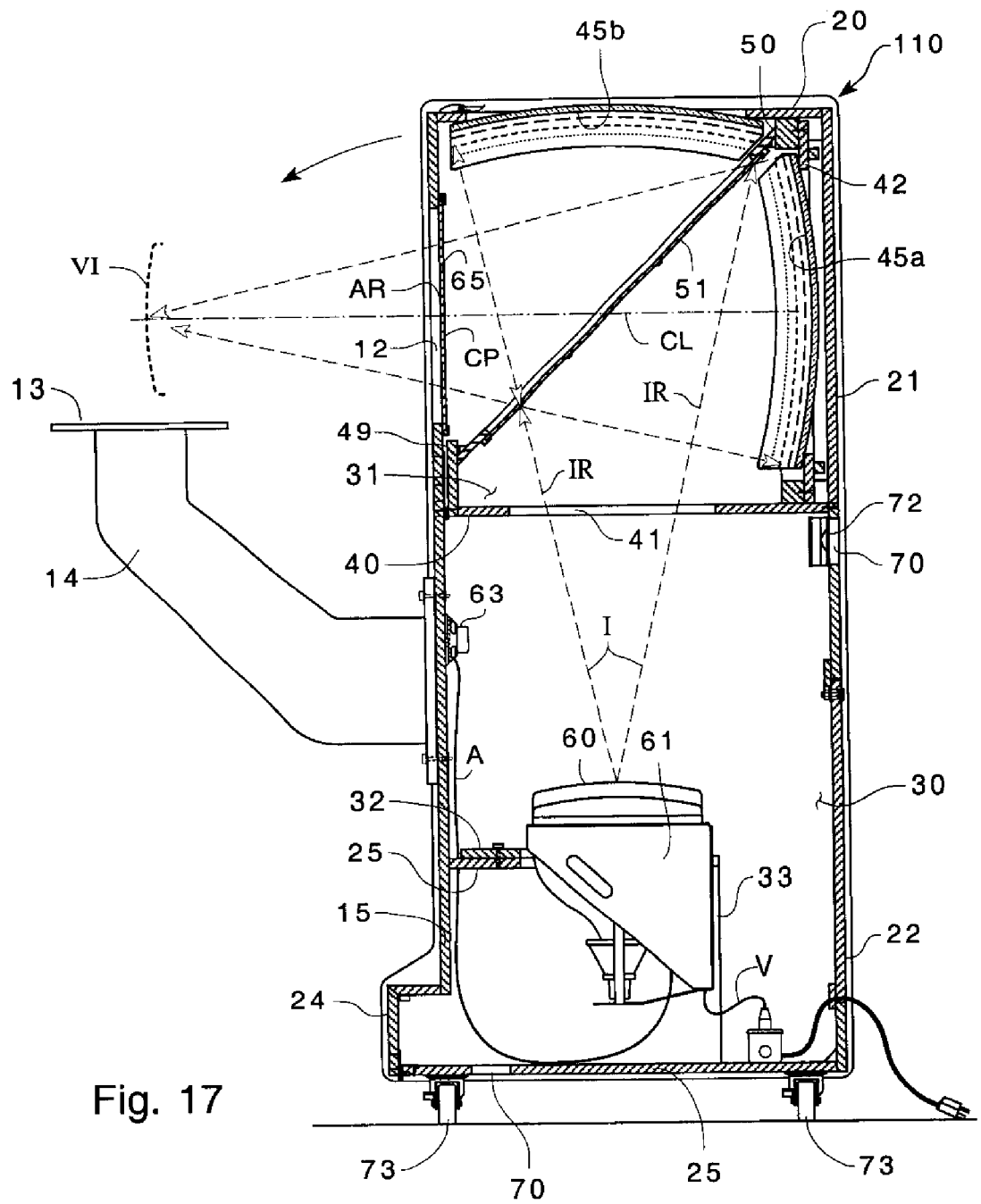
Figure 18:
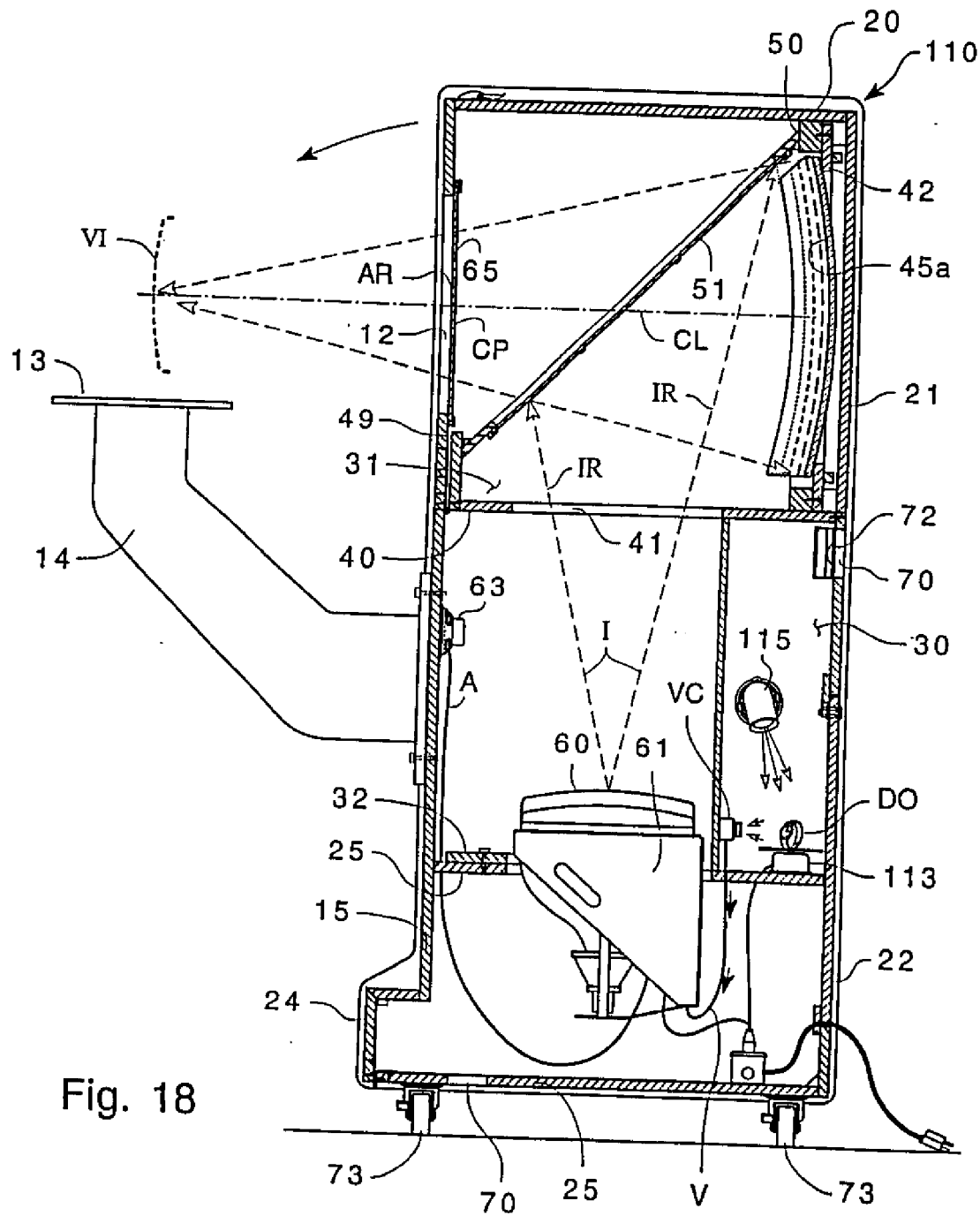
Figure 19A:
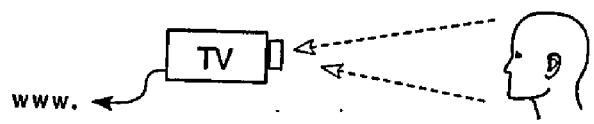
Figure 19:
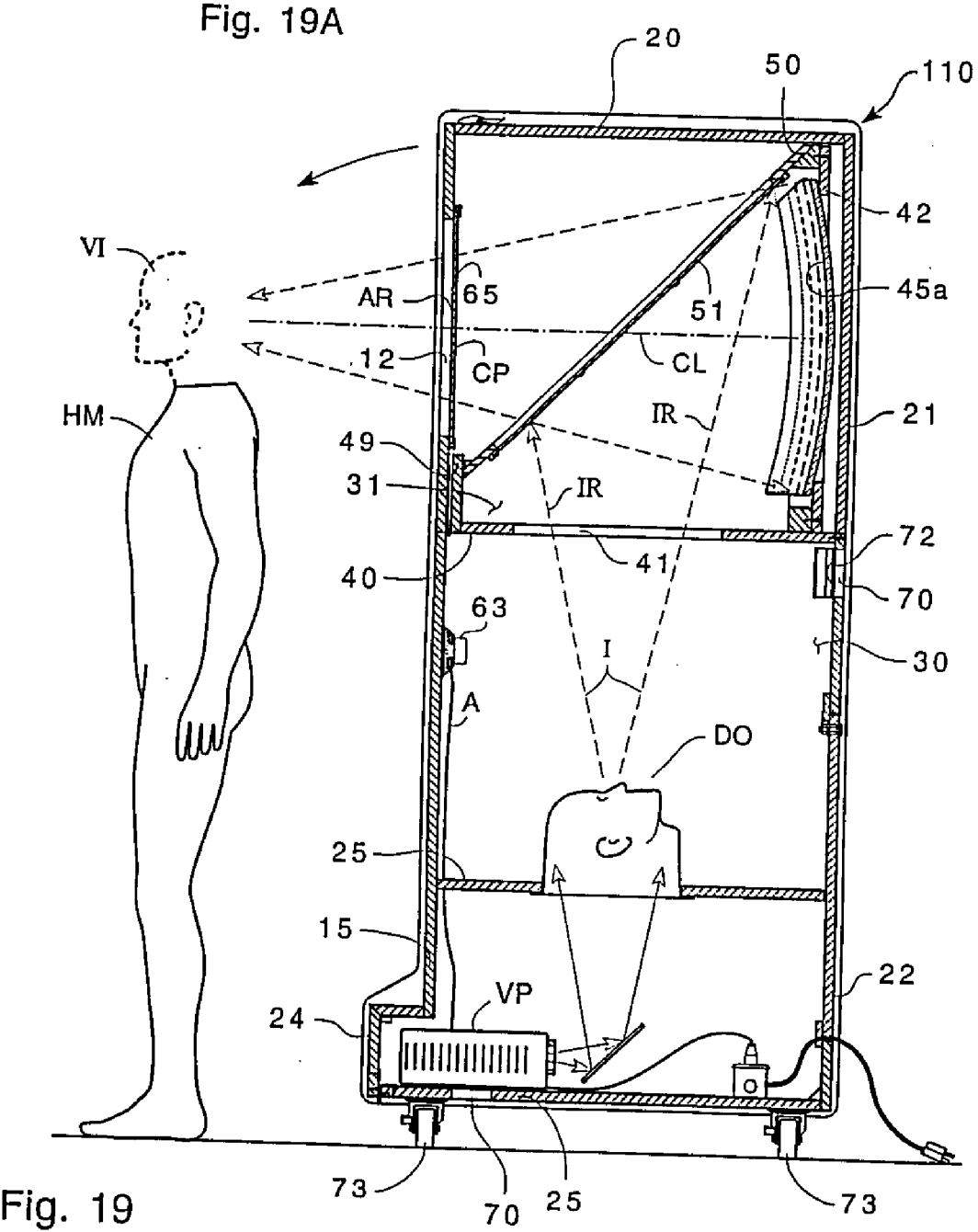
Figure 20:
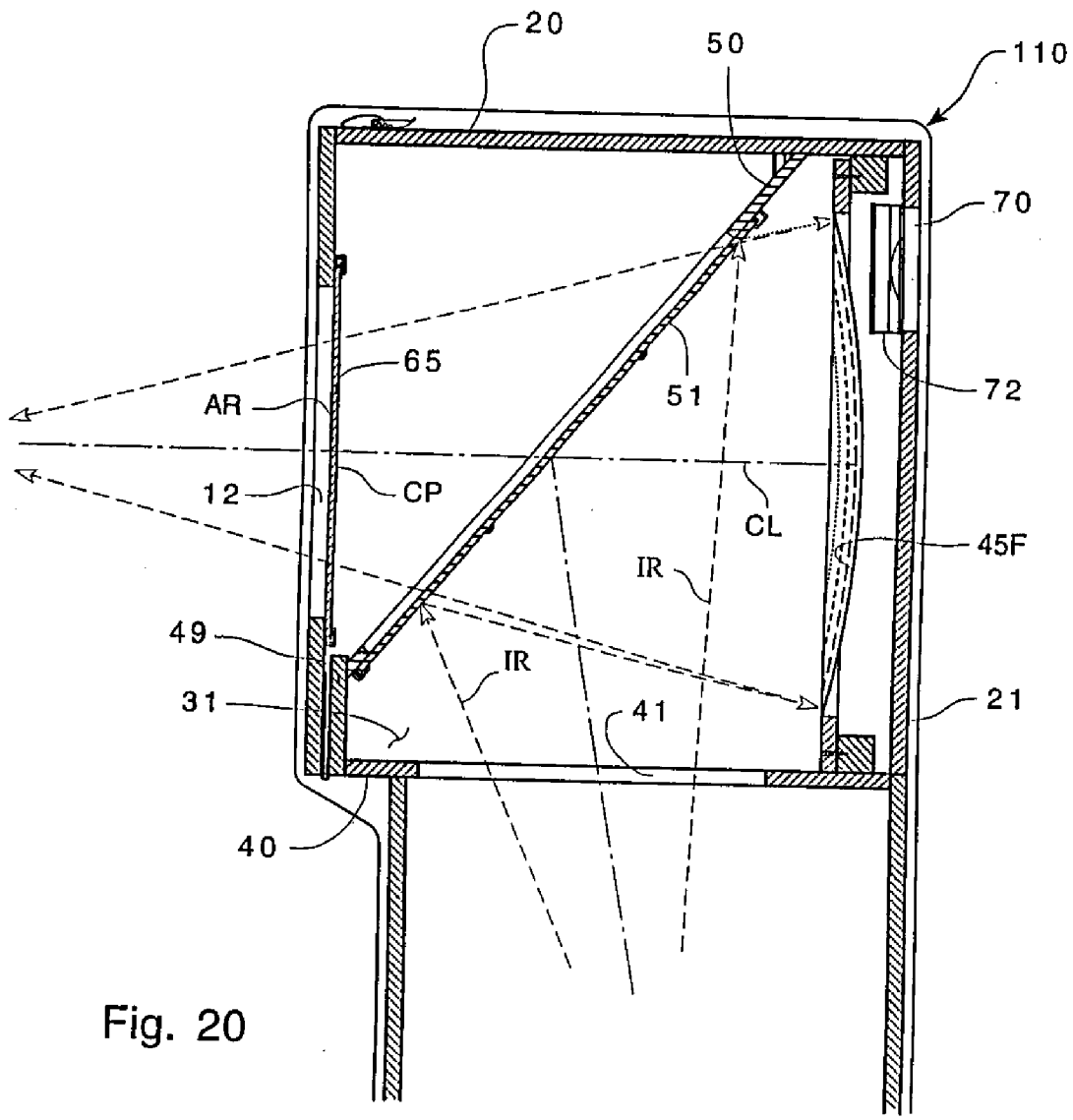
Figure 21:
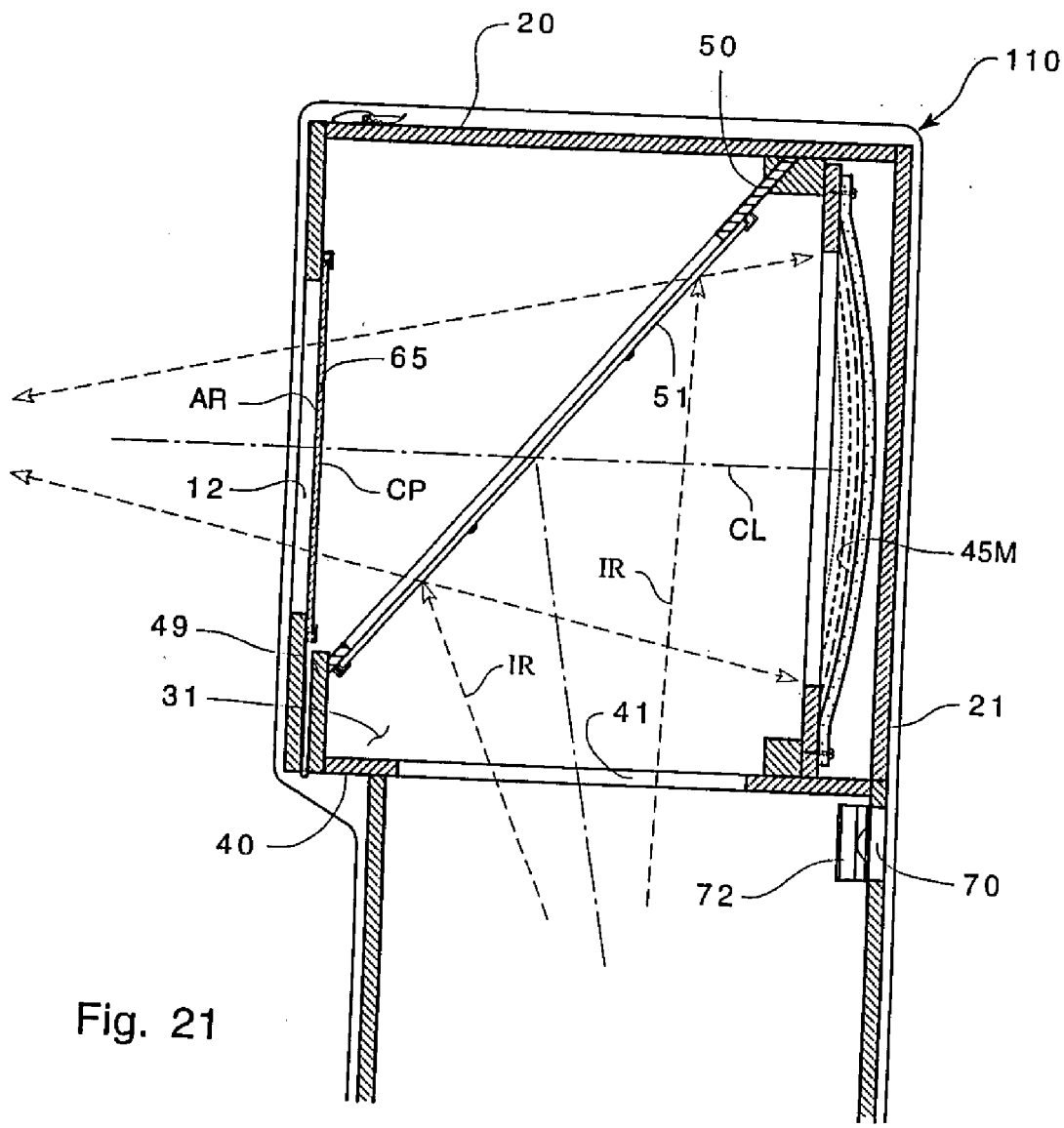
Figure 23:
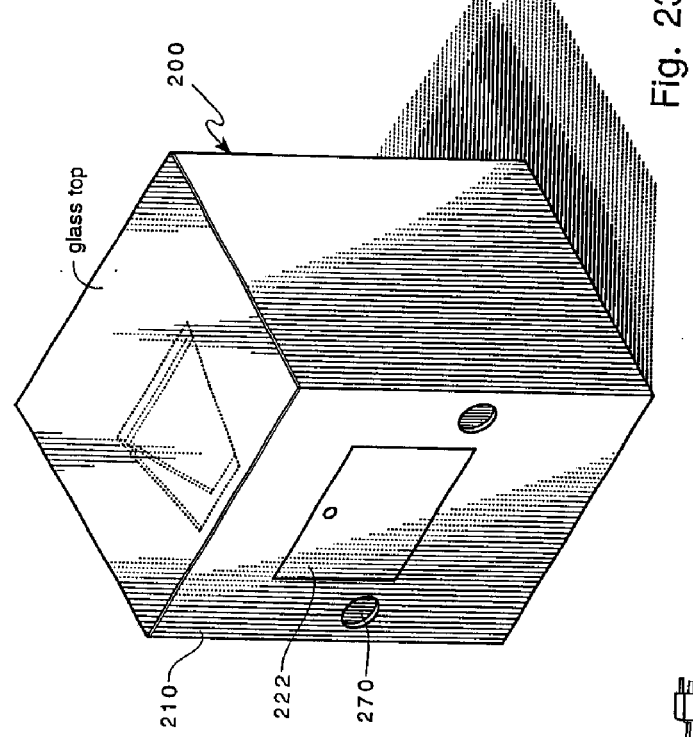
Figure 22:
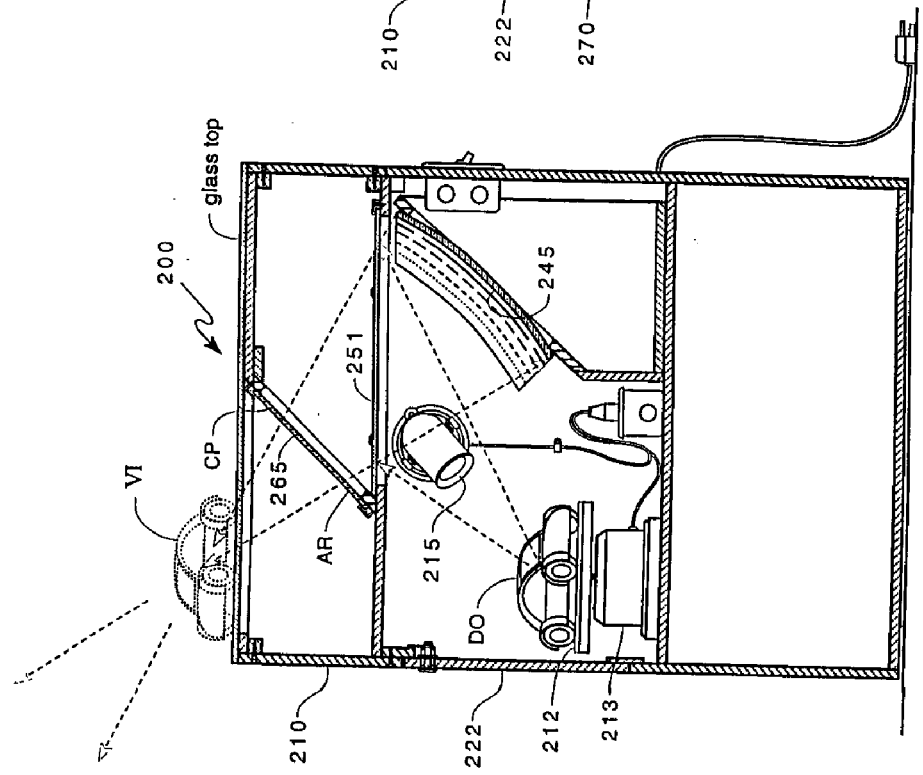

FIG. 22 shows a glass or otherwise transparent-topped display case 200 for use in retail stores (camera and jewelry stores, etc.). The displayed object DO is enclosed in a secure cabinet 210 and illuminated by light source 215 located, for example, on a side wall and outside of the optical path from the displayed object DO to the optics of the system.

Light reflected off of the displayed object DO reflects off the underside of the partially reflective, and partially transparent, beamsplitter 251, and reflects down toward concave mirror 245 which focuses and reflects the light upward at a forward angle through beamsplitter 251, then through circular polarizing filter 265, and through the horizontal glass top to form aerial-image VI. The user unlocks and removes the access door 222 and places the product DO on a turntable 212 which is rotated by a motor 213. Switches on the back turn power on to fans (not shown), lamp(s) 215, and turntable motor 213. Circular polarizing filter 265 virtually blocks all room illumination, including the observer's own image, from being reflected and visible in the concave mirror 245.

Figure 23:
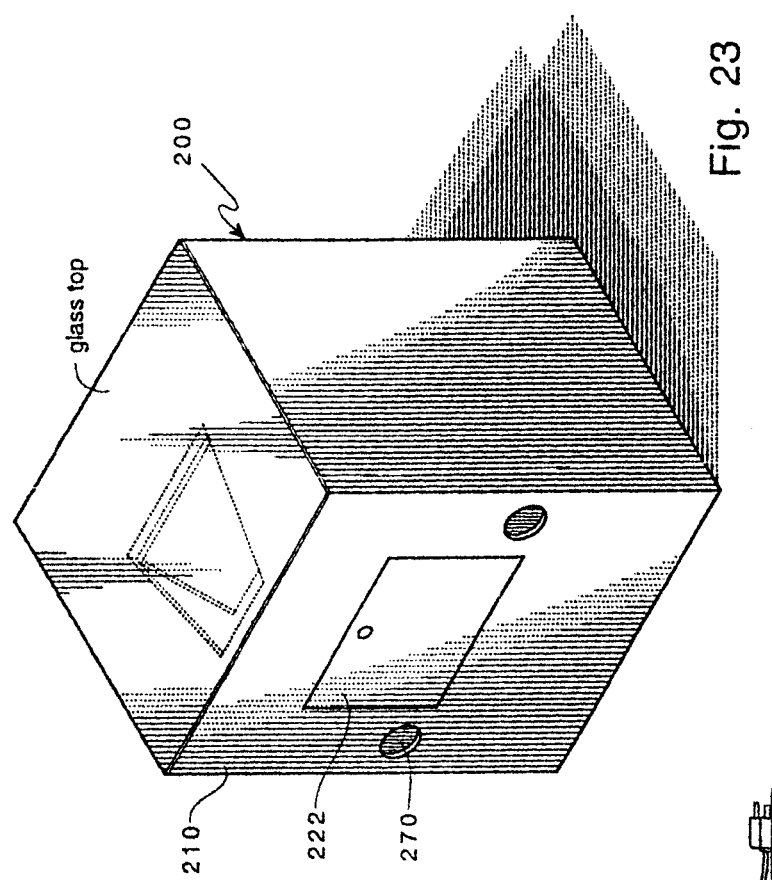
FIG. 23 is an isometric (perspective) view of the glass-topped display case of FIG. 22.

FIG. 23 is an isometric view of the glass-topped counter height, e.g., 30"–42" height, display case 210 of FIG. 22. Visible are the air entrance holes 270, product-access door 222, the glass top, and openings in the opaque horizontal top surface, just under the glass, through which light emerges to form the aerial-image VI. Note that the beamsplitter or partly silvered mirror 251 is now positioned generally parallel to the glass top which acts as the window. The approximately 45-degree angular relationships of the beamsplitter are maintained with the object DO and the mirror 245.

This embodiment is particularly suitable for the display of valuable items that may be damaged by excessive handling or of such value that security is of prime importance. The aerial-image produced by this invention is so realistic that one is tempted to, and usually does, reach out in an attempt to touch it, only to their amazement witness their hand pass completely through the displayed object image.

Employing the embodiments of FIGS. 14 and 15, it is possible to obtain a version of 3D images by combining this invention with the AUTOSTEREOSCOPIC IMAGING SYSTEM of my U.S. Pat. No. 5,430,474, issued Jul. 4, 1995, the contents of which are incorporated by reference in this application. A copy of this U.S. Pat. No. 5,430,474 accompanies this application.

The foregoing describes the principals of this invention and four different embodiments, all of which produce an intriguing image or images of different objects with precise detail and within the reach of the observer. The foregoing embodiments are representative of this invention but are not intended to be limiting. Rather the invention is defined by the scope of claims allowed in the resulting patent including the protection afforded by the Doctrine of Equivalents.

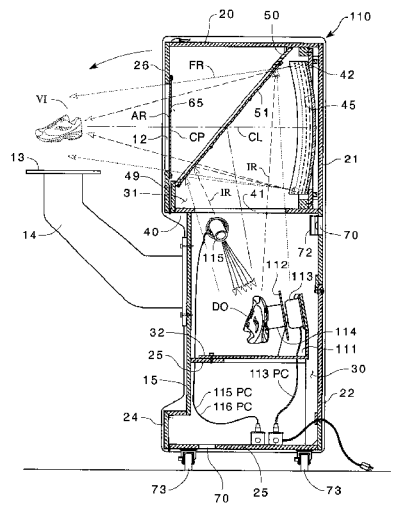

I claim:

1. Countertop height apparatus for producing an aerial-image of an object comprising:

a housing of substantially counter height having a top surface including a window therein;

support means within said housing for an object to be displayed as an aerial-image outside of said window;

means for illuminating said object;

a partially silvered planar beamsplitter positioned in the optical path of light rays from said illuminated object;

a focusing reflector positioned within said housing directed at said window and located at approximately a 45 degree angle with respect to said partially silvered beamsplitter;

whereby light rays from said object are partially reflected by said partially silvered beamsplitter toward said focusing reflector directly through said partially silvered beamsplitter and through said window to produce an aerial-image of said object outside of said housing; and means for preventing an observer who is viewing said aerial-image from seeing reflected images from outside of said housing in said window;

wherein said housing being of substantially counter height and said window is in the top surface thereof, objects contained within said housing are displayed as an aerial-image in the region of the top of the housing window at countertop height.

2. Apparatus in accordance with claim 1 wherein said housing includes a top side, a bottom side, a front side, a rear side and two lateral sides wherein said window constitutes at least a portion of the top side of said housing;

said focusing reflector is secured to the inner region of said rear side;

said object to be displayed is located in the region of the inner surface of said bottom side;

said illuminating means is located in said housing between said partially silvered beamsplitter outside of the optical path from said object and directed at said object.

3. Apparatus in accordance with claim 1 wherein said focusing reflector is metallized molded plastic.

4. Apparatus in accordance with claim 1 wherein said housing being of substantially counter height and said window is in the top side thereof, and wherein said housing includes an internal wall therein extending between the actual location of the object to be displayed and the image displaying portion of said window to obscure viewing of the object through the window.

5. Apparatus in accordance with claim 1 wherein said partially silvered beamsplitter is positioned in said housing generally parallel to said window.

6. Apparatus in accordance with claim 1 wherein said window constitutes an apparent support for the aerial-image.

7. Apparatus in accordance with claim 1 wherein said preventing means comprises a polarizing filter.

8. Apparatus for producing an aerial-image of an object comprising:

a housing including a window therein;

support means within said housing for an object to be displayed as an aerial-image outside of said window;

means for illuminating said object;

partially silvered planar mirror positioned in the optical path of light rays from said illuminated object;

said partially silvered mirror also positioned at approximately a 45-degree angle with respect to said window;

focusing reflector positioned within said housing directed at said window and located at approximately a 45 degree angle with respect to said partially silvered mirror;

whereby light rays from said object are partially reflected by said partially silvered mirror toward said focusing reflector directly through said partially silvered mirror and through said window to produce an aerial-image of said object outside of said housing;

means located between said partially silvered mirror and said window for preventing an observer who is viewing said aerial-image from seeing reflected images from outside of said housing in said window; and including an additional focusing reflector adjacent to the inner surface of said top wall and directed at approximately a 45° angle toward said partially silvered planar mirror whereby an enhanced brightness aerial-image is produced from the reflection of both of said focusing reflectors.

9. Apparatus in accordance with claim 8 wherein said focusing reflectors are metallized molded plastic.

10. Apparatus for producing an aerial-image of an object comprising:

a housing including a window therein;

support means within said housing for an object to be displayed as an aerial-image outside of said window;

means for illuminating said object;

partially silvered planar mirror positioned in the optical path of light rays from said illuminated object;

said partially silvered mirror also positioned at approximately a 45-degree angle with respect to said window;

focusing reflector positioned within said housing directed at said window and located at approximately a 45 degree angle with respect to said partially silvered mirror;

whereby light rays from said object are partially reflected by said partially silvered mirror toward said focusing reflector directly through said partially silvered mirror and through said window to produce an aerial-image of said object outside of said housing;

means located between said partially silvered mirror and said window for preventing an observer who is viewing said aerial-image from seeing reflected images from outside of said housing in said window;

wherein said reflecting means comprises a partial spherical concave mirror having a rear surface for support and a front reflective surface; and including a mirror support secured in said housing;

said mirror support comprising a planar member having a circular aperture therein having a diameter less than said concave mirror; and resilient adhesive means adhering to the support surface of said concave mirror to said mirror support as a bead in contact between said concave mirror and the edge of said circular aperture.

11. An aerial-image display in accordance with claim 10 wherein said resilient adhesive means is silicone cement.

12. An aerial-image display in accordance with claim 10 wherein said resilient adhesive means comprises a pair of bead on one each side of the areas of contact between the rear face of the said mirror and said mirror support.

13. Apparatus for producing an aerial-image of an object comprising:

a housing including a window therein;

support means with said housing for an object to be displayed as an aerial-image outside of said window;

means for illuminating said object;

partially silvered planar mirror positioned in the optical path of light rays from said illuminated object;

said partially silvered mirror also positioned at approximately a 45-degree angle with respect to said window;

focusing reflector positioned within said housing directed at said window and located at approximately a 45 degree angle with respect to said partially silvered mirror;

whereby light rays from said object are partially reflected by said partially silvered mirror toward said focusing reflector directly through said partially silvered mirror and through said window to produce an aerial-image of said object outside of said housing; and means located between said partially silvered mirror and said window for preventing an observer who is viewing said aerial-image from seeing reflected images from outside of said housing in said window; and wherein said housing is a clock enclosure and a clock including a display of time;

wherein said display of time constitutes the image source;

and wherein said focusing reflector comprises a metallized concave region of the interior of the wall of said housing opposite said window.

14. Apparatus for producing an aerial image of an object comprising:

a housing including a window therein;

support means with said housing for an object to be displayed as an aerial image outside of said window;

means for illuminating said object;

partially silvered planar mirror positioned in the optical path of light rays from said illuminated object;

said partially silvered mirror also positioned at approximately a 45 degree angle with respect to said window;

focusing reflector positioned within said housing directed at said window and located at approximately a 45 degree angle with respect to said partially silvered mirror;

whereby light rays from said object are partially reflected by said partially silvered mirror toward said focusing reflector directly through said partially silvered mirror and through said window to produce an aerial image of said object outside of said housing; and means located between said partially silvered mirror and said window for preventing an observer who is viewing said aerial image from seeing reflected images from outside of said housing in said window; and wherein said housing is a video enclosure and a video display;

wherein said video display constitutes the image source; and wherein said focusing reflector comprises a metallized concave region of the interior of the wall of said housing opposite said window.

* * * * *

UNITED STATES PATENT AND TRADEMARK OFFICE
CERTIFICATE OF CORRECTION

PATENT NO. : 6,817,716 B1
DATED : November 16, 2004
INVENTOR(S) : Stephen P. Hines It is certified that error appears in the above-identified patent and that said Letters Patent is hereby corrected as shown below:

The title page, showing the illustrative figure should be deleted and substitute therefor, the attached title page.

Delete drawing sheets 1-21 and substitute therefor, the drawing sheets 1-21 as shown on the attached pages.

Signed and Sealed this

Twenty-ninth Day of March, 2005

JON W. DUDAS
*Director of the United States Patent and Trademark Office*

United States Patent
Hines

(10) Patent No.: US 6,817,716 B1
(45) Date of Patent: Nov. 16, 2004

(54) AERIAL-IMAGE DISPLAY SYSTEMS

(76) Inventor: Stephen P. Hines, 4525-B San Fernando Rd., Glendale, CA (US) 91204

(*) Notice: Subject to any disclaimer, the term of this patent is extended or adjusted under 35 U.S.C. 154(b) by 0 days.

(21) Appl. No.: 10/655,974

(22) Filed: Sep. 5, 2003

Related U.S. Application Data

(63) Continuation of application No. 09/687,618, filed on Oct. 13, 2000, now abandoned.
(60) Provisional application No. 60/159,223, filed on Oct. 13, 1999.

(51) Int. Cl.$^7$ .............. G03B 21/00; G03B 21/26; G02B 27/14
(52) U.S. Cl. .............. 353/10; 353/7; 353/28; 359/631
(58) Field of Search .............. 353/10, 7, 28; 359/629–631

(56) References Cited

U.S. PATENT DOCUMENTS

| | | | |
|---|---|---|---|
| 243,813 A | 7/1881 | Taylor | 359/448 |
| 1,699,689 A | 1/1929 | Curry | 40/538 |
| 2,490,747 A | 12/1949 | Creighton | 356/251 |
| 2,576,147 A | 11/1951 | Sauvage | 40/427 |
| 3,096,389 A | 7/1963 | Dudley | 359/871 |
| 3,443,858 A | 5/1969 | La Russa | 359/494 |
| 3,493,290 A | 2/1970 | Traub | 359/479 |
| 4,093,347 A | 6/1978 | La Russa | 359/630 |
| 4,200,366 A | 4/1980 | Freeman | 353/78 |
| 4,348,187 A | 9/1982 | Dotsko | 434/44 |
| 4,671,625 A | 6/1987 | Noble | 359/726 |
| 4,859,031 A | 8/1989 | Berman et al. | 349/11 |
| 5,214,458 A | 5/1993 | Kanai | 353/63 |
| 5,311,357 A | 5/1994 | Summer et al. | 359/479 |
| 5,430,474 A | 7/1995 | Hines | 348/42 |
| 5,457,508 A | 10/1995 | Ichihara et al. | 353/10 |
| 5,477,394 A | 12/1995 | Shibazaki | 359/858 |
| 5,483,307 A | 1/1996 | Anderson | 353/98 |
| 5,552,934 A | 9/1996 | Prince | 359/629 |
| 5,671,992 A | 9/1997 | Richards | 353/7 |
| 5,782,547 A | 7/1998 | Machtig et al. | 353/28 |
| 5,886,818 A | 3/1999 | Summer et al. | 359/478 |
| 5,940,167 A | 8/1999 | Gans | 352/43 |
| 5,944,403 A | 8/1999 | Krause | 353/74 |
| 6,042,235 A * | 3/2000 | Machtig et al. | 353/28 |
| 6,147,805 A | 11/2000 | Fergason | 359/630 |
| D435,043 S * | 12/2000 | Hines | D14/304 |
| 6,211,613 B1 | 4/2001 | May | 313/504 |
| 6,292,305 B1 | 9/2001 | Sakuma et al. | 359/649 |
| 6,318,868 B1 * | 11/2001 | Larussa | 359/857 |

FOREIGN PATENT DOCUMENTS

| | | |
|---|---|---|
| CH | 67934 | 1/1992 |
| WO | WO 89/09423 | 10/1989 |

* cited by examiner

Primary Examiner—David Gray
Assistant Examiner—Magda Cruz
(74) Attorney, Agent, or Firm—John E. Wagner

(57) ABSTRACT

Apparatus for producing aerial-images is disclosed employing a combination of focusing reflectors, beamsplitter polarizing filters, and light sources. An object to be displayed is illuminated, and its image partially reflected by the beamsplitter to a focusing mirror and reflected to an aerial position. A polarizer prevents ambient light or images from degrading or interfering with the aerial-image. A clock radio, personal television display counter, as well as animated mannequin versions are disclosed.

14 Claims, 21 Drawing Sheets